(12) United States Patent
Mizunuma et al.

(10) Patent No.: US 10,840,964 B2
(45) Date of Patent: Nov. 17, 2020

(54) SMARTPHONE CASE

(71) Applicant: Murata Manufacturing Co., Ltd., Kyoto (JP)

(72) Inventors: Ryuken Mizunuma, Kyoto (JP); Satoshi Tanaka, Kyoto (JP); Hideki Ueda, Kyoto (JP); Yasuhisa Yamamoto, Kyoto (JP); Akiko Itabashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/653,244

(22) Filed: Oct. 15, 2019

(65) Prior Publication Data

US 2020/0119760 A1   Apr. 16, 2020

(30) Foreign Application Priority Data

Oct. 16, 2018   (JP) .................................. 2018-195342
Jul. 29, 2019   (JP) .................................. 2019-139089

(51) Int. Cl.
| | |
|---|---|
| *H04B 1/38* | (2015.01) |
| *H04M 1/00* | (2006.01) |
| *H04B 1/3888* | (2015.01) |
| *H04B 7/0413* | (2017.01) |
| *H04B 1/3883* | (2015.01) |
| *H02J 7/00* | (2006.01) |

(52) U.S. Cl.
CPC ......... *H04B 1/3888* (2013.01); *H04B 1/3883* (2013.01); *H04B 7/0413* (2013.01); *H02J 7/0063* (2013.01)

(58) Field of Classification Search
CPC .. H04B 1/3883; H04B 1/3888; H04B 5/0037; H04B 5/0062; H04B 7/04; H04M 1/022; H04M 1/0254; H04M 1/026; H04M 1/72527; H04W 84/12; H04W 88/02
See application file for complete search history.

(56) References Cited

U.S. PATENT DOCUMENTS

| | | | | |
|---|---|---|---|---|
| 7,508,347 | B2 * | 3/2009 | Sakama | ........... G06K 19/07745 |
| | | | | 340/572.7 |
| 9,207,715 | B2 * | 12/2015 | Filipovic | ............. H04M 1/0254 |
| 9,342,102 | B2 * | 5/2016 | Kim | ...................... H04B 1/3888 |
| 9,722,325 | B2 * | 8/2017 | Svendsen | ................. H01Q 7/00 |
| 10,141,650 | B2 * | 11/2018 | Tenno | ....................... H01Q 1/38 |
| 10,205,224 | B2 * | 2/2019 | Mow | ...................... H01Q 1/243 |
| 10,437,295 | B1 * | 10/2019 | Filipovic | ................ A61B 5/748 |

(Continued)

FOREIGN PATENT DOCUMENTS

| | | |
|---|---|---|
| JP | 2013-114306 A | 6/2013 |
| JP | 2018-121216 A | 8/2018 |

*Primary Examiner* — Quochien B Vuong
(74) *Attorney, Agent, or Firm* — Pearne & Gordon LLP

(57) ABSTRACT

A smartphone case that enables millimeter-wave band communication to be robust in terms of connection stability is provided. The smartphone case is to be removably attached to a smartphone and includes one or more millimeter-wave band communication antennas associated with a communication circuit for carrying out millimeter-wave band communication. This configuration offers a high degree of flexibility in the layout of the one or more millimeter-wave band communication antennas, with the performance of a 5G communication system being fully exploited.

13 Claims, 39 Drawing Sheets

(56) References Cited

U.S. PATENT DOCUMENTS

2014/0128131 A1* 5/2014 Sin ................... H04M 1/185
　　　　　　　　　　　　　　　　　　　455/575.8
2019/0081402 A1* 3/2019 Kato .................. H01Q 9/42

* cited by examiner

US 10,840,964 B2

SMARTPHONE CASE

This application claims priority from Japanese Patent Application No. 2018-195342 filed on Oct. 16, 2018, and claims priority from Japanese Patent Application No. 2019-139089 filed on Jul. 29, 2019. The content of these applications are incorporated herein by reference in their entireties.

BACKGROUND

The present disclosure relates to a smartphone case.

Mobile communication terminals, such as mobile phones and mobile information terminals, wireless LAN terminals, and other communication devices that accommodate multi-standard (multi-mode) communications are available. These communication devices are provided with multiple communication systems supporting the second-generation mobile communication system (hereinafter also simply referred to as "2G"), the third-generation mobile communication system (hereinafter also simply referred to as "3G"), and the fourth-generation mobile communication system (hereinafter also simply referred to as "4G"), which are based on different communications standards including Global System for Mobile Communications (GSM) (registered trademark), Wideband Code Division Multiple Access (W-CDMA), Long Term Evolution (LTE), and Bluetooth (registered trademark). These communication devices, each provided with multiple communication systems to accommodate multi-mode communications carry out communication by using multiple frequency bands (multi-bands), with the multiple communication systems associated with respective frequency bands. As such a communication device, an electronic device such as a smartphone is disclosed in, for example, Japanese Unexamined Patent Application Publication No. 2013-114306.

There has been work toward adoption of the fifth-generation mobile communication system (hereinafter also simply referred to as "5G") as the latest communication standard for mobile terminals. The band covered by 5G is divided into "sub-6" for communication at a frequency of 6 GHz or lower and submillimeter-wave and millimeter-wave bands for high-frequency communication at a frequency of 24.25 GHz or higher. Communication circuits consume a lot of power particularly when carrying out communication in the sub-millimeter-wave and millimeter-wave bands, which may be used under limited conditions accordingly.

To support 5G, communication devices such as smartphones need to include, in addition to communication circuits for 2G, 3G, and 4G and a communication circuit for WiFi communication, a communication circuit for the sub-6 and the millimeter-wave bands to be used in 5G. In some cases, where the circuits for 2G, 3G, and 4G and the communication circuit for WiFi communication are provided, there is not enough space left for a communication circuit for 5G and an antenna for communication in the millimeter-wave bands. Such a configuration may fail to provide stable connectivity due to the layout of components of the communication device or due to external perturbations. It is thus difficult to enable millimeter-wave band communication robust in terms of connection stability.

BRIEF SUMMARY

The present disclosure enables millimeter-wave band communication to be robust in terms of connection stability.

According to embodiments of the present disclosure, a smartphone case is to be removably attached to a smartphone and includes one or more millimeter-wave band communication antennas associated with a communication circuit for carrying out millimeter-wave band communication.

This configuration offers a high degree of flexibility in the layout of the one or more millimeter-wave band communication antennas, with the performance of a 5G communication system being fully exploited.

Other features, elements, characteristics and advantages of the present disclosure will become more apparent from the following detailed description of embodiments of the present disclosure with reference to the attached drawings.

DETAILED DESCRIPTION

Hereinafter, communication devices according to embodiments of the present disclosure will be described in detail with reference to the drawings. The following embodiments should not be construed as limiting the scope of the present disclosure. The embodiments described herein are merely examples. Needless to say, partial replacements or combinations of configurations illustrated according to different embodiments are possible. Redundant description of features common to Embodiment 1 and another embodiment will be omitted, and Embodiment 2 and subsequent embodiments will be described with regard to their distinctive features alone. Similarly, actions and effects caused by similar configurations according to multiple embodiments will not be described for each embodiment.

Embodiment 1

Figure 1:
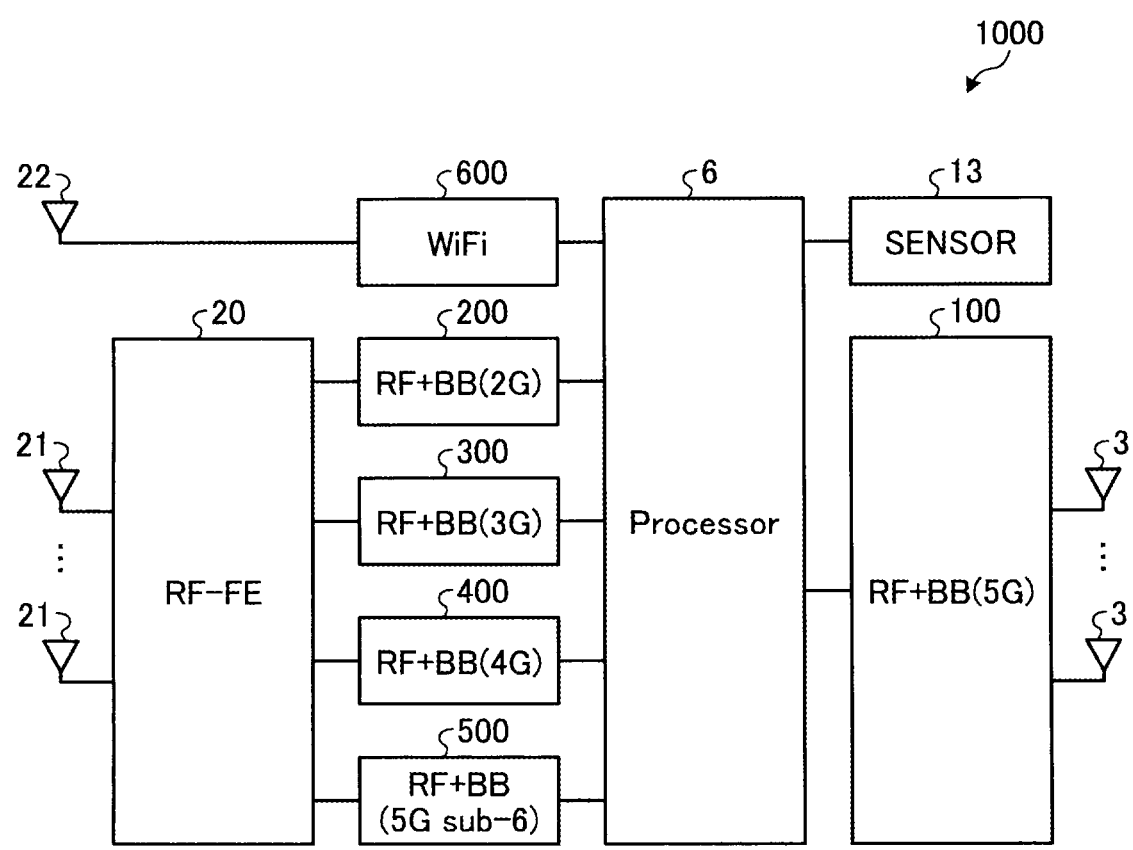
FIG. 1 is a block diagram illustrating a schematic configuration of a 5G-compatible communication system.

FIG. 1 is a block diagram illustrating a schematic configuration of a 5G-compatible communication system. As illustrated in FIG. 1, a communication system 1000 includes a communication circuit (RF+BB (2G)) 200 for 2G, a communication circuit (RF+BB (3G)) 300 for 3G, a communication circuit (RF+BB (4G)) 400 for 4G, a communication circuit (RF+BB (5G sub-6))500 for 5G sub-6, a radio-frequency (RF) front-end circuit 20, radio-frequency (RF) antennas 21, a communication circuit 600 for WiFi communication, a WiFi antenna 22, a communication circuit 100 for 5G millimeter-wave band communication, millimeter-wave band communication antennas 3, a sensor 13, and a processor 6. According to the present disclosure, frequency bands for use in millimeter-wave band communication include, in addition to semimillimeter-wave and millimeter-wave bands such as 28 GHz band, 39 GHz band, and 60 GHz band, the following bands defined by IEEE: X-band (8 to 12 GHz), Ku-band (12 to 18 GHz), K-band (18 to 27 GHz), Ka-band (27 to 40 GHz), and V-band (40 to 75 GHz).

Figure 2A:
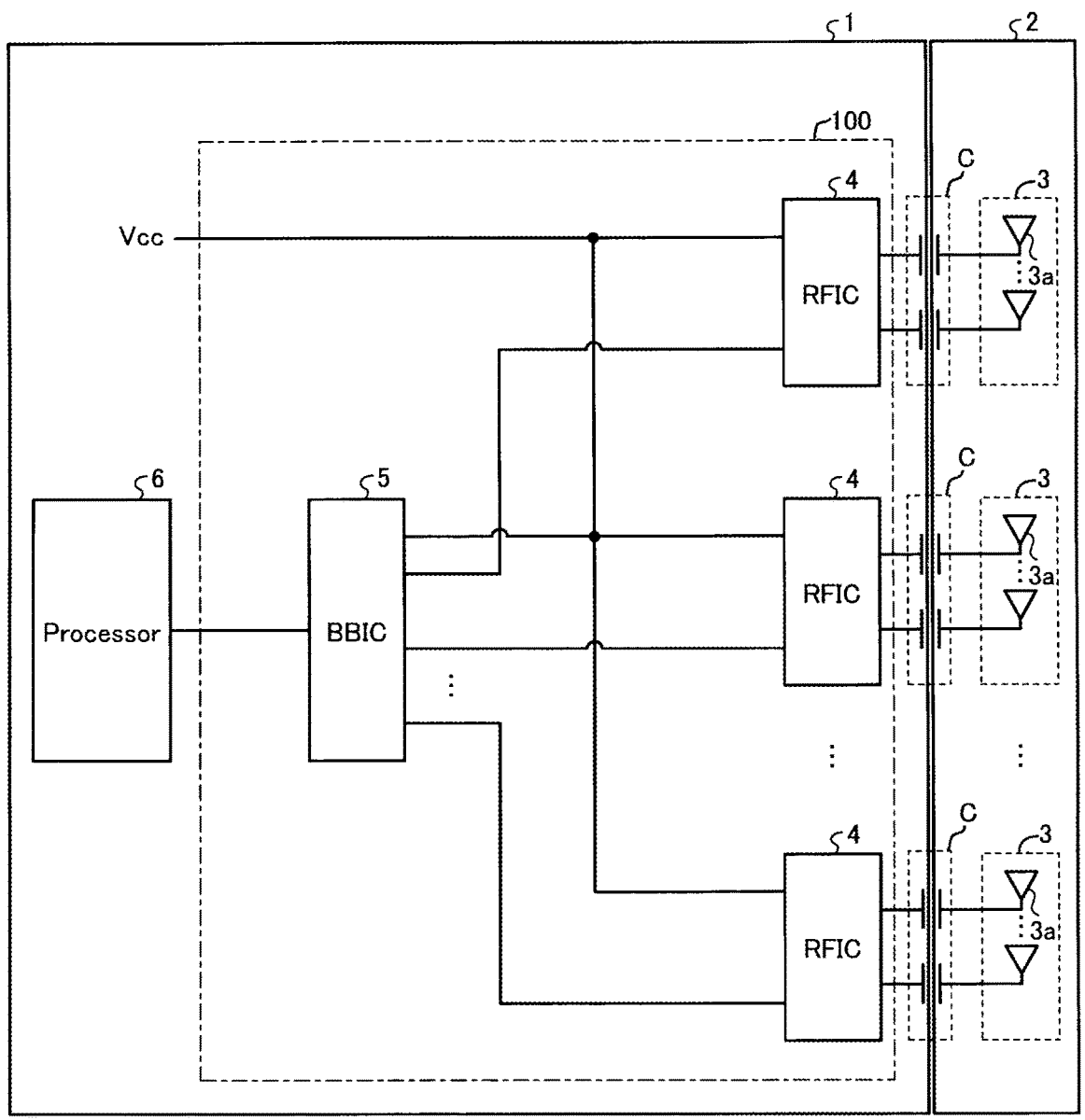
FIG. 2A is a block diagram illustrating a first example of a communication circuit for 5G millimeter-wave band communication according to Embodiment 1.
Figure 2B:
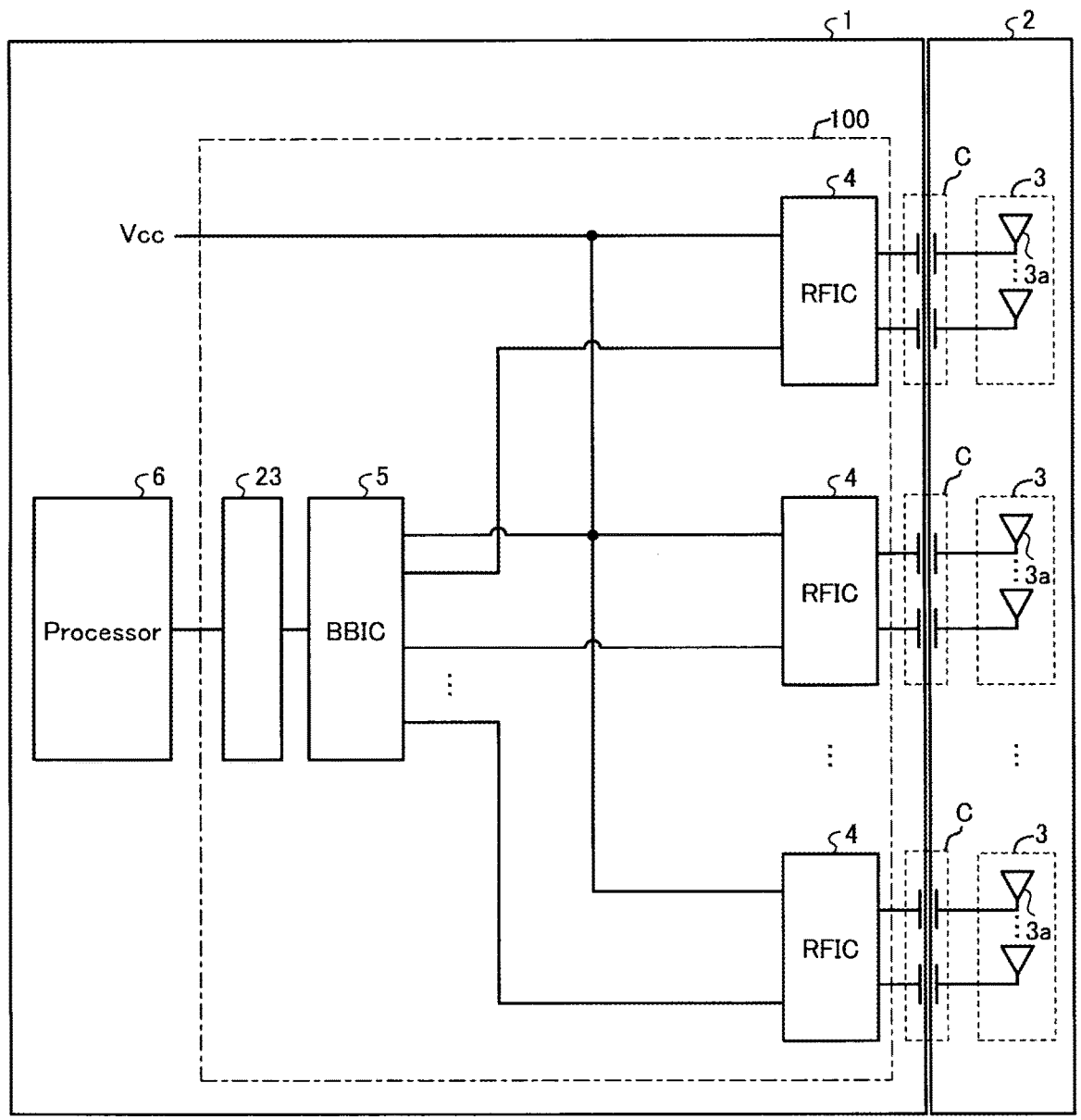
FIG. 2B is a block diagram illustrating a second example of the communication circuit for 5G millimeter-wave band communication according to Embodiment 1.

FIG. 2A is a block diagram illustrating a first example of the communication circuit for 5G millimeter-wave band communication according to Embodiment 1. FIG. 2B is a block diagram illustrating a second example of the communication circuit for 5G millimeter-wave band communication according to Embodiment 1.

As illustrated in FIGS. 2A and 2B, the communication circuit 100 includes, for example, radio-frequency integrated circuits (RFICs) 4 that process radio-frequency signals and a baseband integrated circuit (BBIC) 5 that processes baseband signals.

As illustrated in FIG. 2B, a conversion circuit 23 may be disposed on a transmission path between the processor 6 and the BBIC 5. For example, a serial transmission line may form a connection between the processor 6 and the communication circuit 100. In this case, the conversion circuit 23 may be configured to perform serial/parallel conversion. Alternatively, transmission between the processor 6 and the communication circuit 100 may be accomplished by optical fiber communication. In this case, the conversion circuit 23 may be configured to perform optical/electrical signal conversion.

A smartphone case 2 according to the present disclosure is to be removably attached to a smartphone 1 and includes the millimeter-wave band communication antennas 3 that transmit and receive millimeter-wave band signals. In the present embodiment, the smartphone 1 includes the components of the communication system 1000 in FIG. 1, except for the millimeter-wave band communication antennas 3.

Figure 3A:
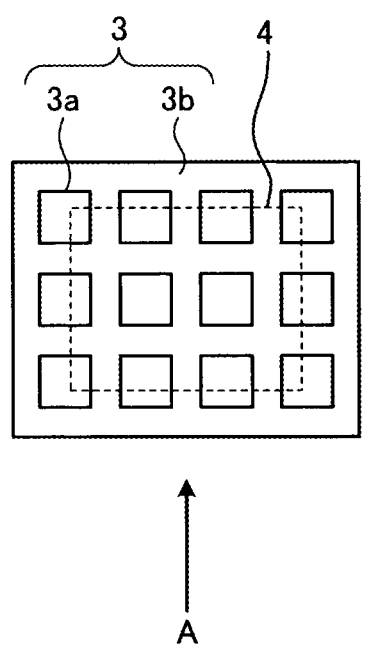
FIG. 3A is a plan view of a millimeter-wave band communication antenna and a radio-frequency integrated circuit (RFIC), illustrating their positional relationship.
Figure 3B:
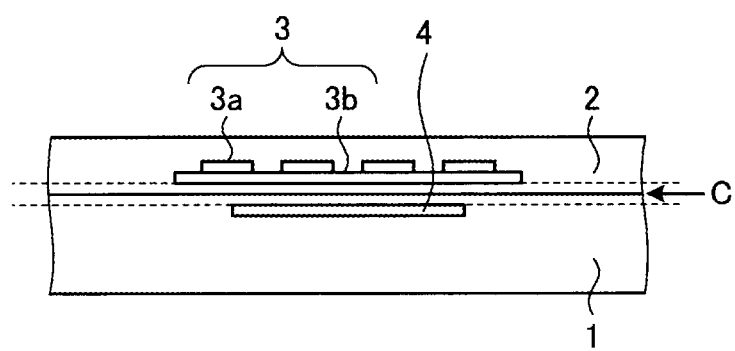
FIG. 3B is a plan view of the millimeter-wave band communication antenna and the RFIC illustrated in FIG. 2A and seen in the direction of the arrow A, illustrating their positional relationship.

FIG. 3A is a plan view of a millimeter-wave band communication antenna and the RFIC, illustrating their positional relationship. FIG. 3B is a view of the millimeter-wave band communication antenna and the RFIC illustrated in FIG. 3A and seen in the direction of the arrow A, illustrating their positional relationship.

As illustrated in 3A, each millimeter-wave band communication antenna 3 includes patch antennas 3a. Each millimeter-wave band communication antenna 3 is an array antenna including the patch antennas 3a arranged on a surface of a dielectric substrate 3b. Each patch antenna 3a is a radiation conductor disposed on the surface of the dielectric substrate 3b. The surface of the dielectric substrate 3b on which the patch antennas 3a are disposed is the radiation surface of the millimeter-wave band communication antenna 3.

Substrates that may be used as the dielectric substrate 3b include: a low-temperature co-fired ceramic (LTCC) multilayer substrate; a multilayer resin substrate including epoxy layers, polyimide layers, or other resin layers stacked on top of one another; a multilayer resin substrate including resin layers made from liquid crystal polymer (LCP) of lower dielectric constant and stacked on top of one another; a multilayer resin substrate including fluororesin layers stacked on top of one another; and a ceramic multilayer substrate (other than low-temperature co-fired ceramic substrates).

The RFIC 4 is disposed so as to face a back surface of the dielectric substrate 3b. That is, the RFIC 4 is disposed so as to face a surface of the millimeter-wave band communication antenna 3 opposite to the radiation surface thereof. Although the patch antennas 3a illustrated in FIGS. 3A and 3B are arranged in a four-by-three matrix, the matrix size of the patch antennas 3a may be varied.

As illustrated in FIG. 3B, the millimeter-wave band communication antenna 3 is provided in the smartphone case 2 and the RFIC 4 is provided in the smartphone 1. In the present embodiment, capacitive coupling C is provided between the millimeter-wave band communication antenna 3 and the RFIC 4. Through the capacitive coupling C, power is fed from the RFIC 4 to the individual patch antennas 3a of the millimeter-wave band communication antenna 3. Without necessarily electric contacts in the smartphone 1, this configuration enables millimeter-wave band communication.

Each of FIGS. 2A and 2B illustrates the configuration in which the communication circuit 100 is provided with the multiple millimeter-wave band communication antennas 3 and the multiple RFICs 4. In each of the configurations illustrated in FIGS. 2A and 2B, the communication circuit 100 may carry out millimeter-wave band communication under the multiple-input multiple-output (MIMO) scheme to enhance the communication speed in such a manner that the multiple millimeter-wave band communication antennas 3 and the multiple RFICs 4 simultaneously transmit and receive different millimeter-wave band signals. Alternatively, in each of the configurations illustrated in FIGS. 2A and 2B, the communication circuit 100 may carry out millimeter-wave band communication under the diversity scheme to enhance the communication quality and reliability in such a manner that the multiple millimeter-wave band communication antennas 3 and the multiple RFICs 4 simultaneously receive the same millimeter-wave band signals and an antenna and an RFIC in a better reception state are then selected from the millimeter-wave band communication antennas 3 and the RFICs 4 and are used to carry out the communication.

Figure 4:
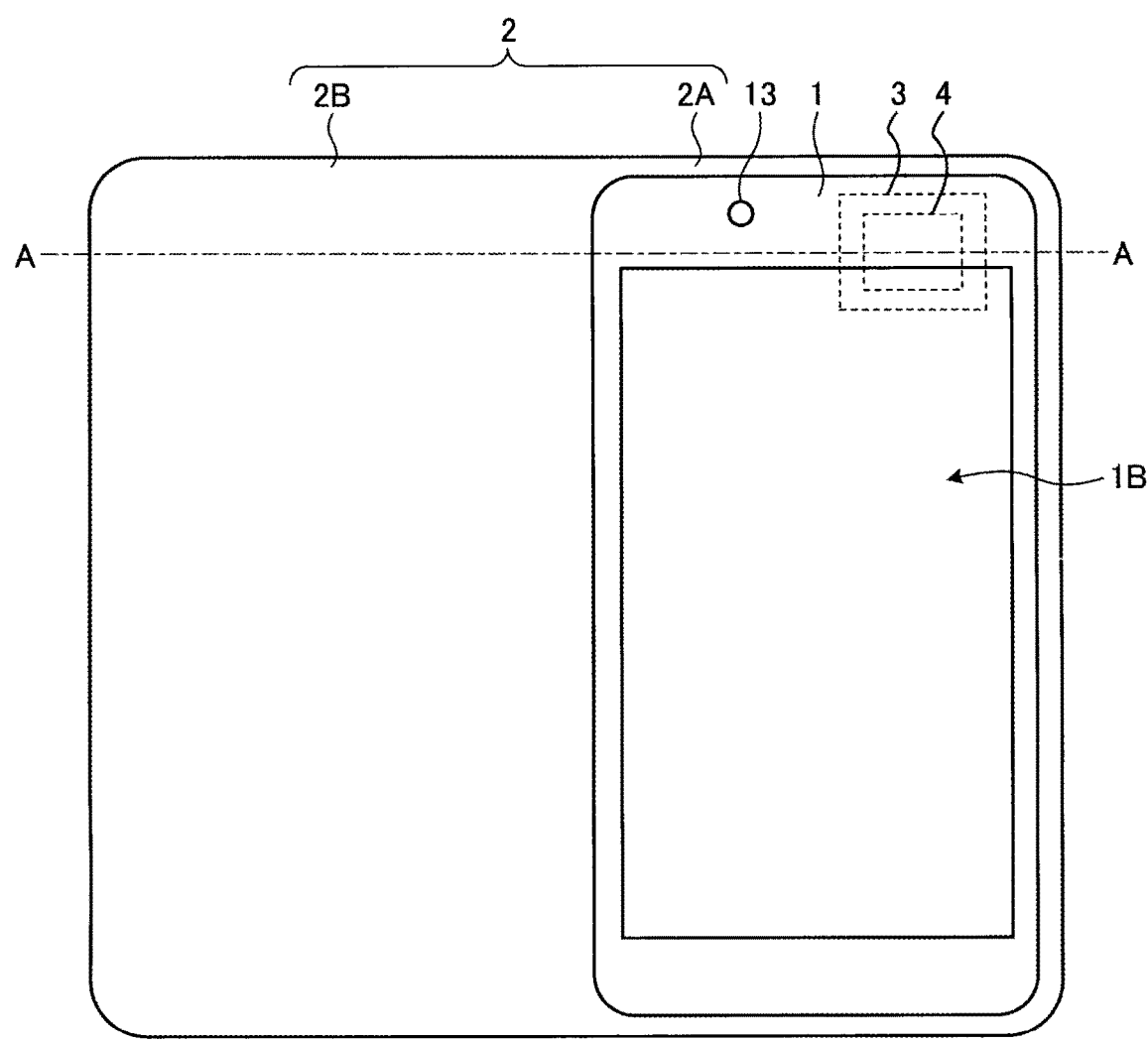
FIG. 4 is a plan view of a smartphone case and a smartphone according to Embodiment 1, illustrating a first example in which the smartphone case is coupled with the smartphone.
Figure 5:
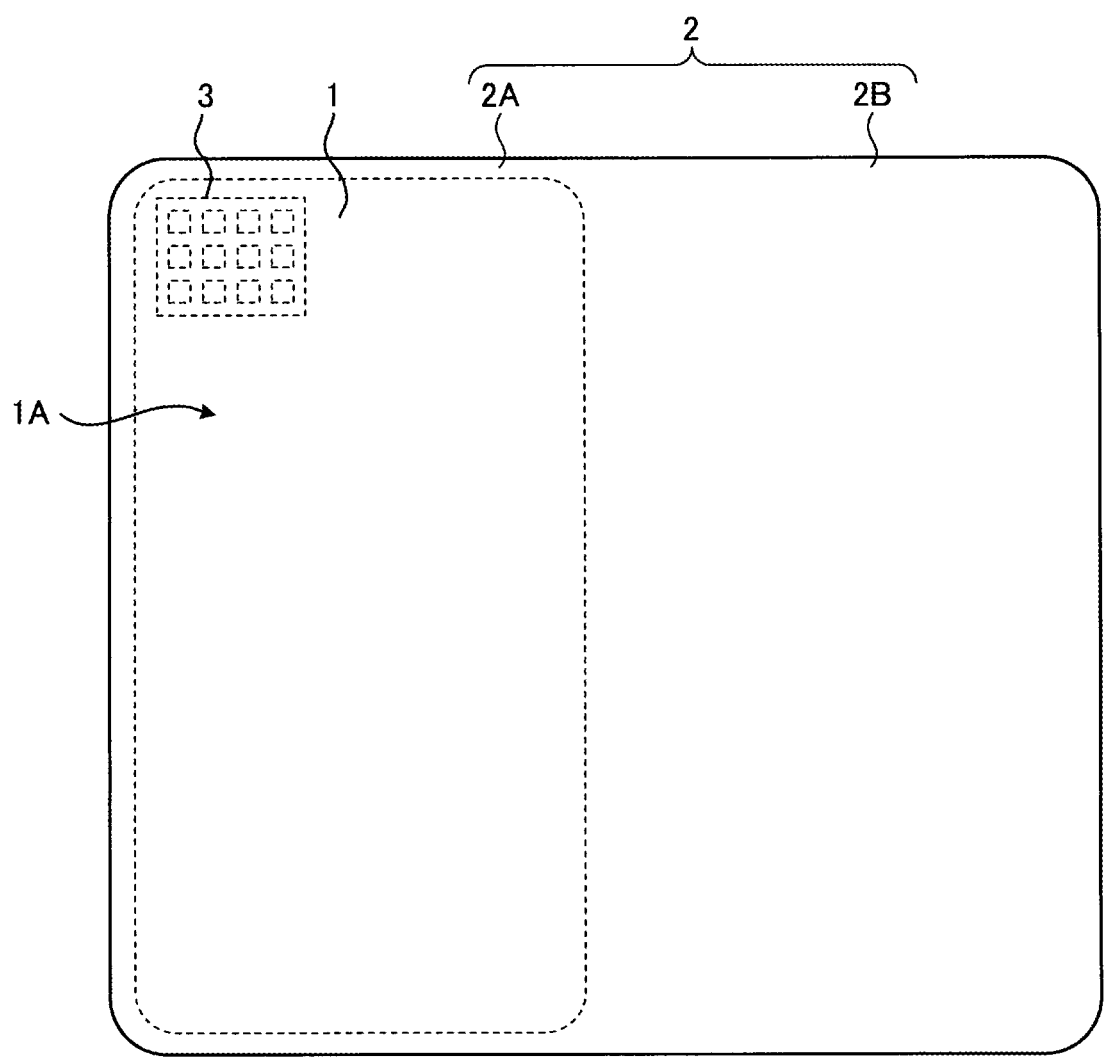
FIG. 5 is a plan view of the smartphone case illustrated in FIG. 4 and seen from a back surface thereof.
Figure 6:
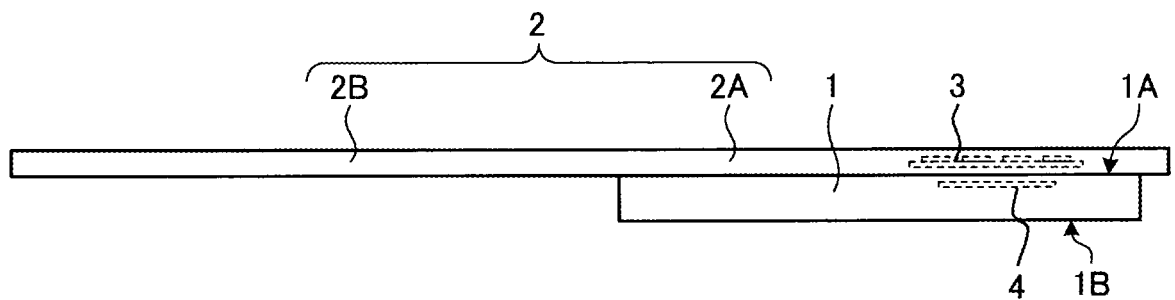
FIG. 6 is a sectional view of the smartphone case and the smartphone taken along line A-A in FIG. 4.

FIG. 4 is a plan view of the smartphone case and the smartphone according to Embodiment 1, illustrating a first example in which the smartphone case is coupled with the smartphone. FIG. 5 is a plan view of the smartphone case illustrated in FIG. 4 and seen from a back surface thereof. FIG. 6 is a sectional view of the smartphone case and the smartphone taken along line A-A in FIG. 4. Referring to FIGS. 4 to 6, the smartphone 1 has a display surface 1B provided with a display and a back surface 1A opposite to the display surface 1B, with no display on the back surface 1A. The smartphone case 2 according to the present embodiment is intended as a "notebook type case" that includes, as illustrated in FIGS. 4 to 6, a back surface portion 2A, to which the back surface 1A of the smartphone 1 is to be attached, and a front surface portion 2B for protecting the display surface 1B of the smartphone 1, and is made of a single material, such as genuine leather, synthetic leather, or resin, or is made of varying combinations these materials.

FIGS. 4 to 6 illustrate an example of the smartphone case 2 with the millimeter-wave band communication antenna 3 provided in the back surface portion 2A. In the present embodiment, the RFIC 4 is provided in the back surface 1A of the smartphone 1 as described above.

Although one millimeter-wave band communication antenna 3 is provided in the back surface portion 2A of the smartphone case 2 illustrated in FIGS. 4 to 6, more than one millimeter-wave band communication antennas 3 may be provided in the back surface portion 2A of the smartphone case 2. With more than one millimeter-wave band communication antennas 3, more than one corresponding RFICs 4 are also provided in the back surface 1A of the smartphone 1.

In the present embodiment, the smartphone 1 includes the communication circuit 200 for 2G, the communication circuit 300 for 3G, the communication circuit 400 for 4G, the communication circuit 500 for 5G sub-6, and the communication circuit 600 for WiFi communication, with limited space available for components for the 5G millimeter-wave bands. It is thus difficult to enable millimeter-wave band communication robust in terms of connection stability. The reason for this is as follows. At the frequencies for the 5G millimeter-wave band communication, the transmission distance is short. The transmission distance may be increased by using the beamforming technique, which requires multiple array antennas. Unlike the case with antennas for hitherto-used frequencies, arranging such array antennas in a cluster is extremely difficult.

In the present embodiment, the millimeter-wave band communication antenna 3 is provided in the back surface portion 2A of the smartphone case 2. This configuration offers a high degree of flexibility in the layout of the millimeter-wave band communication antenna 3. This configuration also offers a high degree of flexibility in the layout of the patch antennas 3a constituting the millimeter-wave band communication antenna 3 and enables precise beamforming accordingly. As described above, providing the multiple millimeter-wave band communication antennas 3 and the multiple RFICs 4 to enable millimeter-wave band communication under the MIMO scheme or under the diversity scheme will enhance the communication speed, the communication quality, and the reliability of the millimeter-wave band communication.

Figure 7:
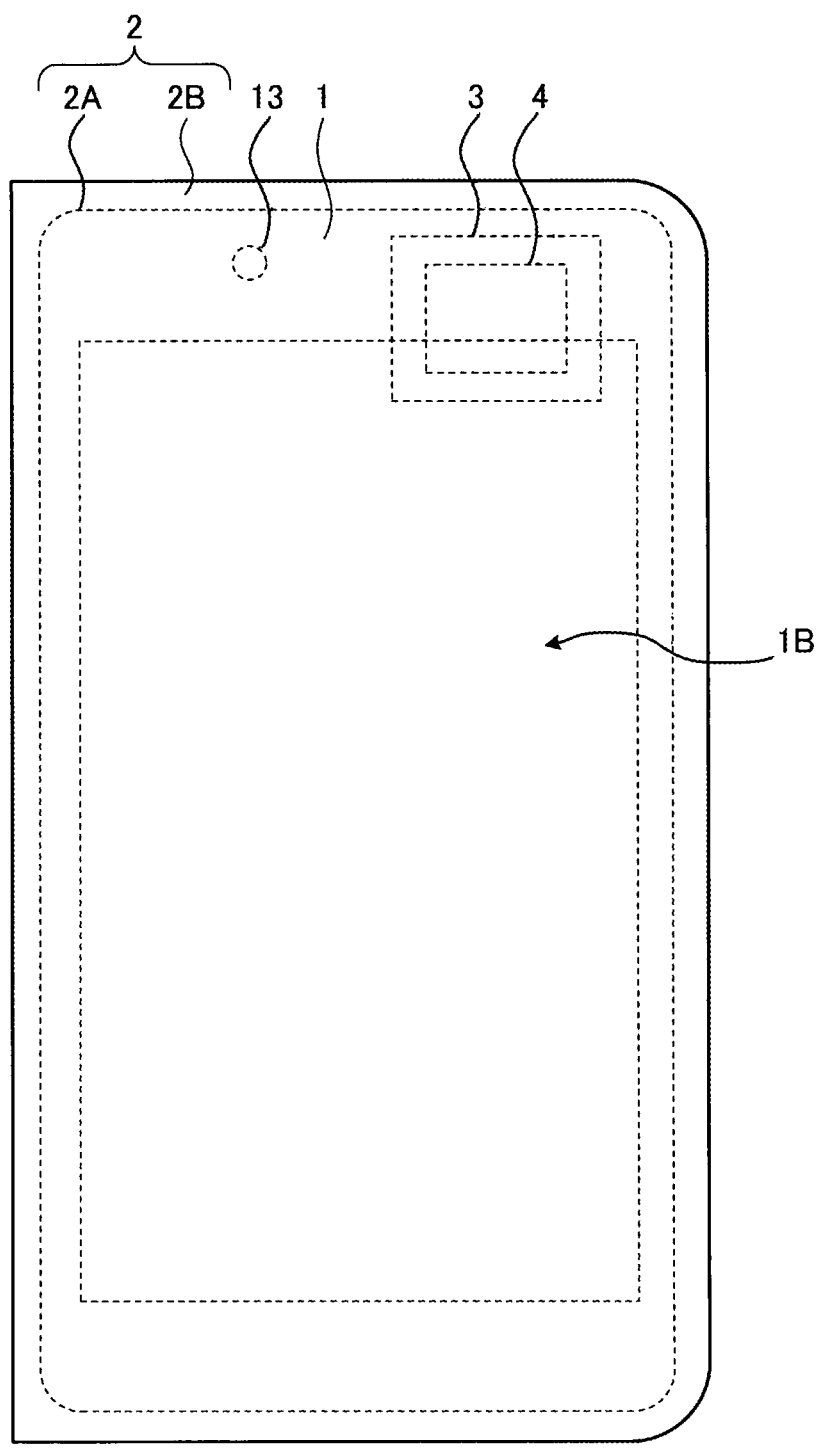
FIG. 7 is a plan view of the smartphone case in FIG. 4, illustrating its folded state.

FIG. 7 is a plan view of the smartphone case in FIG. 4, illustrating its folded state. The state in which the display surface 1B of the smartphone 1 faces the front surface portion 2B of the smartphone case 2 as illustrated in FIG. 7 is hereinafter also described as the "folded state" of the smartphone case 2.

In each of the configurations illustrated in FIGS. 4 to 7, the smartphone 1 includes, as in FIG. 1, the sensor 13, which senses the folded state of the smartphone case 2.

In each of the configurations illustrated in FIGS. 4 to 7, the sensor 13 is a proximity sensor embedded in the display surface 1B of the smartphone 1. When the smartphone case 2 is folded as in FIG. 7, the sensor 13 senses that the front surface portion 2B of the smartphone case 2 is close to the sensor and thus senses the folded state of the smartphone case 2.

Figure 8:
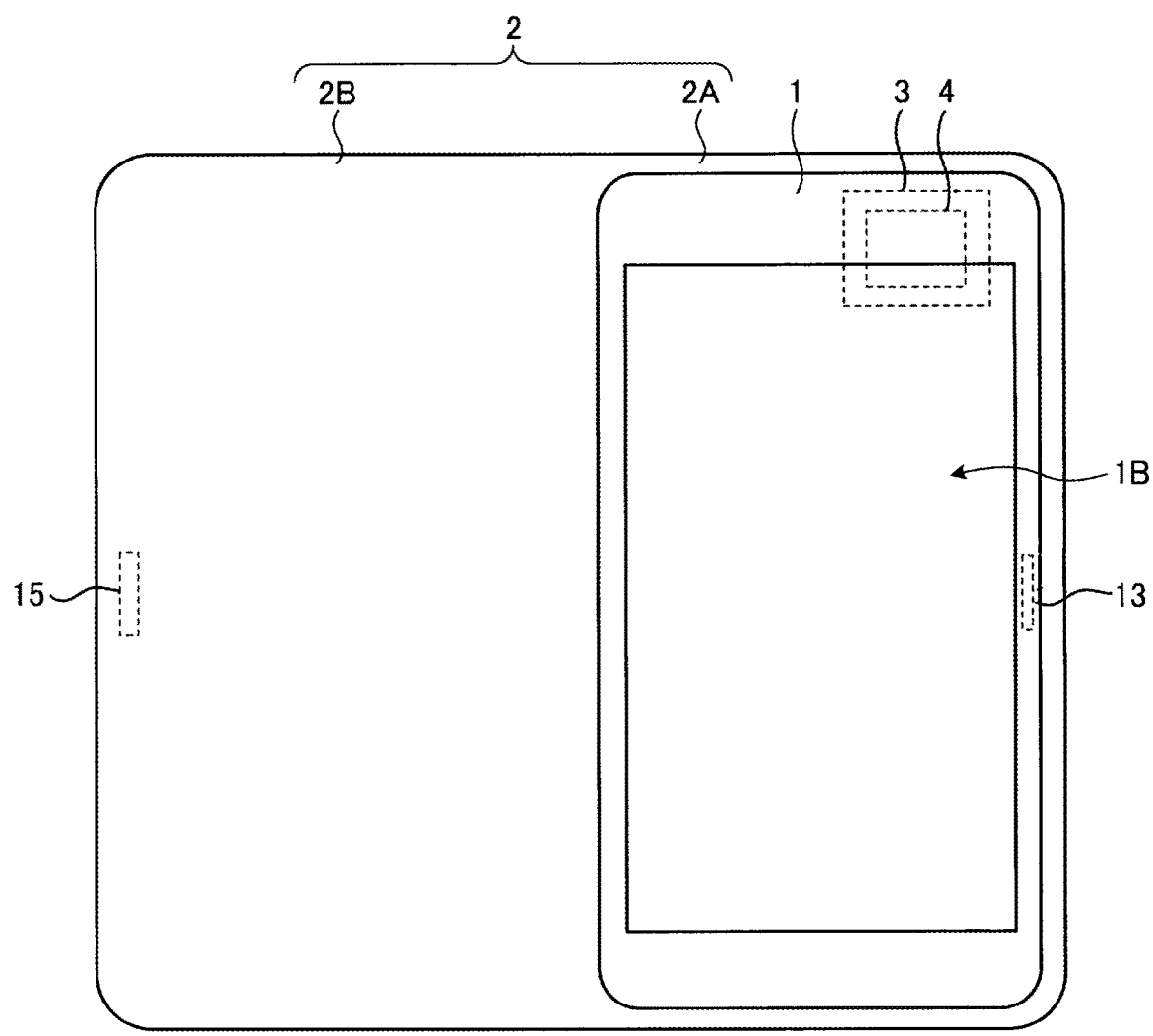
FIG. 8 is a plan view of a smartphone case and a smartphone according to Embodiment 1, illustrating a second example in which the smartphone case is coupled with the smartphone.
Figure 9:
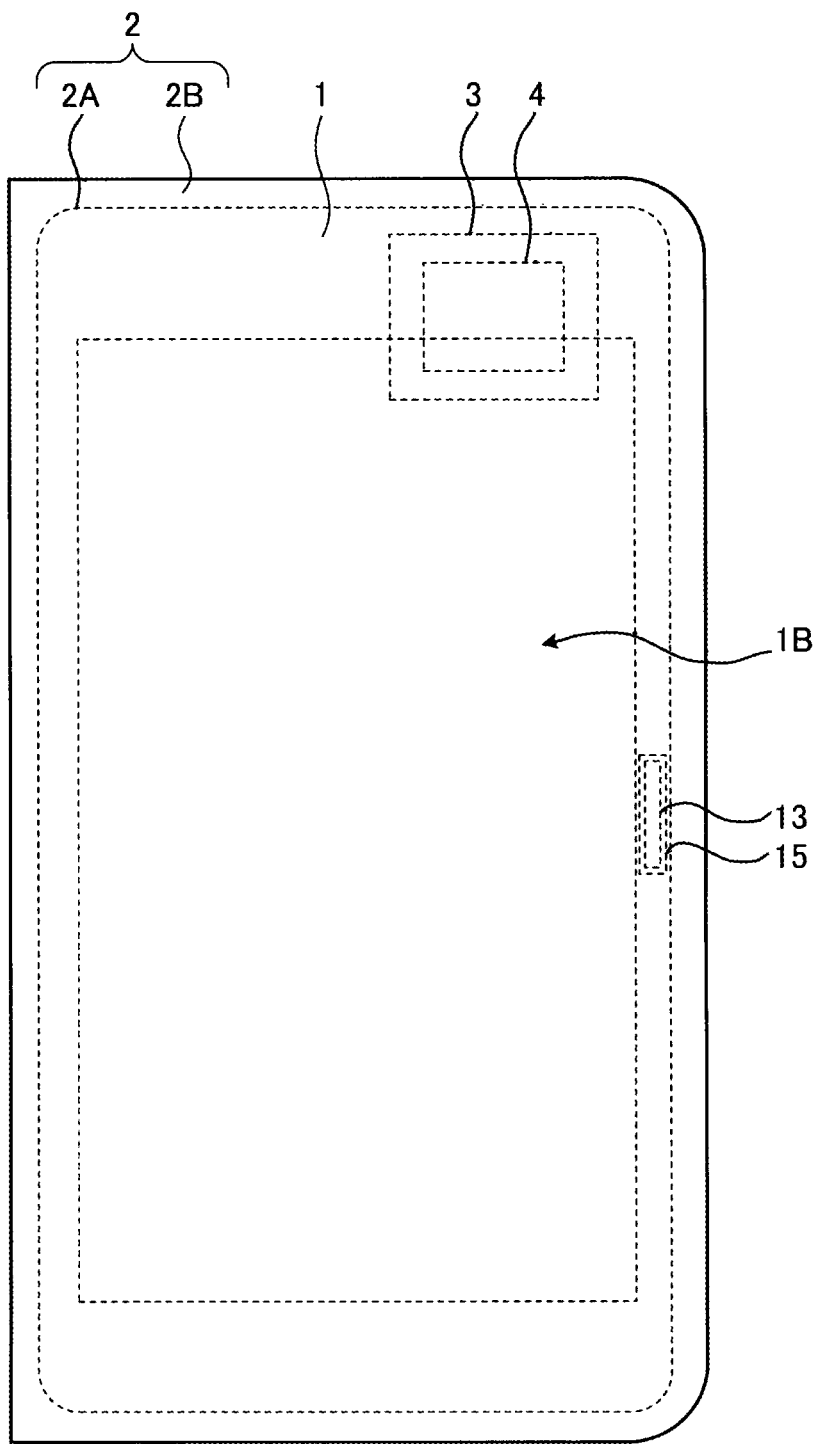
FIG. 9 is a plan view of the smartphone case in FIG. 8, illustrating its folded state.

FIG. 8 is a plan view of the smartphone case and the smartphone according to Embodiment 1, illustrating a second example in which the smartphone case is coupled with the smartphone. FIG. 9 is a plan view of the smartphone case in FIG. 8, illustrating its folded state.

In each of the configurations illustrated in FIGS. 8 and 9, the sensor 13 is a magnetic sensor embedded in the display surface 1B of the smartphone 1. When the smartphone case 2 is folded as in FIG. 9, the sensor 13 detects magnetism of a magnet 15 embedded in the front surface portion 2B of the smartphone case 2 and thus senses the folded state of the smartphone case 2.

The sensor 13 is not limited to the proximity sensor or the magnetic sensor and may be any sensor that can sense the folded state of the smartphone case 2.

When the sensor 13 senses the folded state of the smartphone case 2, the smartphone 1 causes the communication circuit 100 for 5G to stop carrying out the millimeter-wave band communication while letting the communication circuits 200, 300, 400, 500, and 600 keep carrying out communication. Thus, the smartphone 1 carries out the millimeter-wave band communication when the need to do so arises, that is, only while the user keeps the smartphone case 2 unfolded. This leads to a reduction in power consumption and to extended battery life.

Embodiment 2

Figure 10:
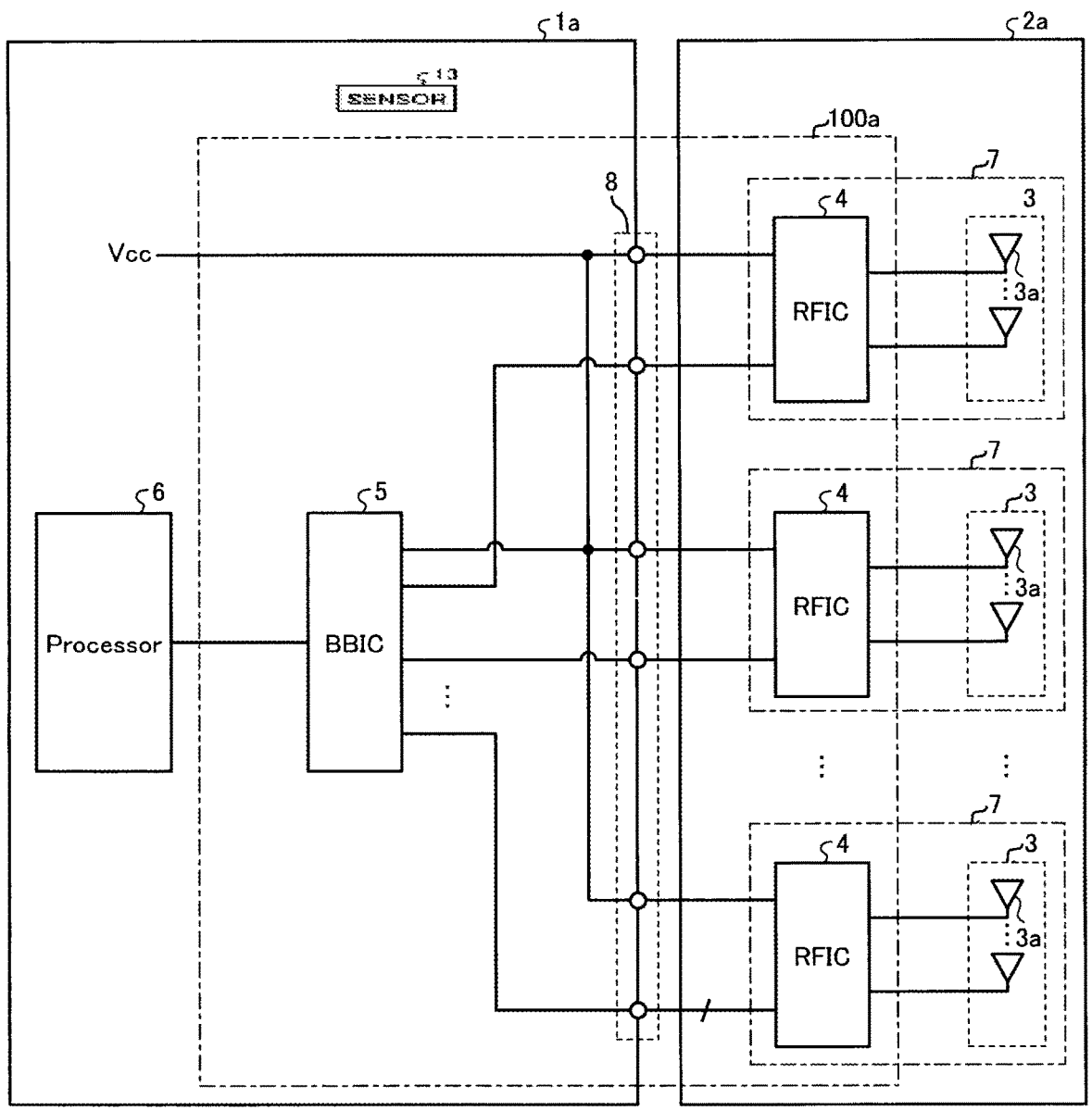
FIG. 10 is a block diagram illustrating a communication circuit for 5G millimeter-wave band communication according to Embodiment 2.

FIG. 10 is a block diagram illustrating a communication circuit for 5G millimeter-wave band communication according to Embodiment 2. As in Embodiment 1 described above, the conversion circuit 23 may be disposed on a transmission path between the processor 6 and the BBIC 5.

As illustrated in FIG. 10, the RFIC 4 and the millimeter-wave band communication antenna 3 in the present embodiment are combined into an RF module 7. In the present embodiment, a smartphone case 2a includes RF modules 7, each of which is a unit into which the millimeter-wave band communication antenna 3 and the RFIC 4 are combined.

In the present embodiment, a smartphone 1a is electrically connected to the smartphone case 2a via a connector 8.

Figure 11A:
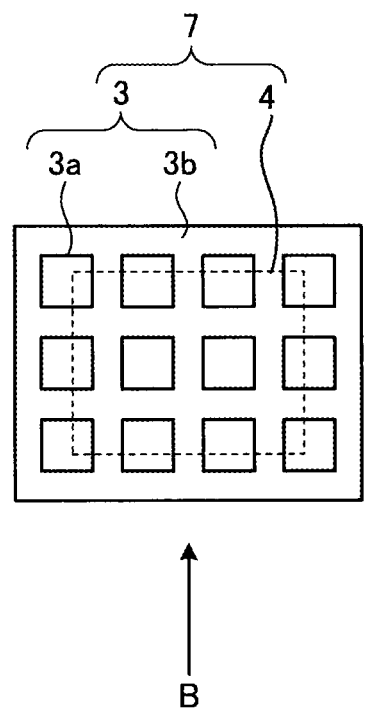
FIG. 11A illustrates an example of an RF module.
Figure 11B:
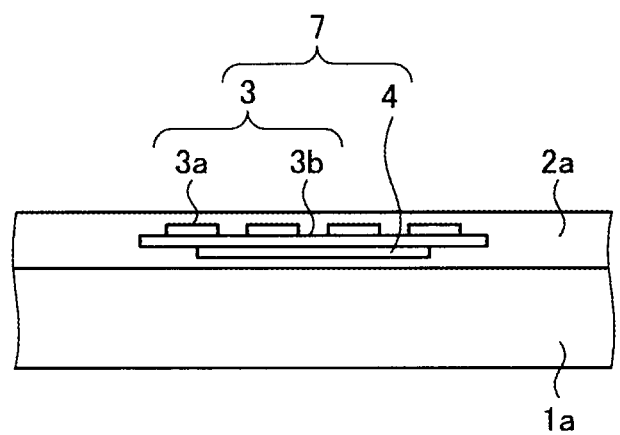
FIG. 11B is a view of the RF module illustrated in FIG. 11A and seen in the direction of the arrow B.

FIG. 11A illustrates an example of the RF module. FIG. 11B is a view of the RF module illustrated in FIG. 11A and seen in the direction of the arrow B.

As illustrated in FIGS. 11A and 11B, the RF module 7 is constructed in such a manner that the RFIC 4 is disposed on the back surface of the dielectric substrate 3b, with the patch antennas 3a disposed on another surface of the dielectric substrate 3b, that is, the RFIC 4 is disposed on the surface opposite to the radiation surface of the millimeter-wave band communication antenna 3.

Although the patch antennas 3a illustrated in FIGS. 11A and 11B are arranged in a four-by-three matrix, the matrix size of the patch antennas 3a may be varied as in Embodiment 1.

Figure 12:
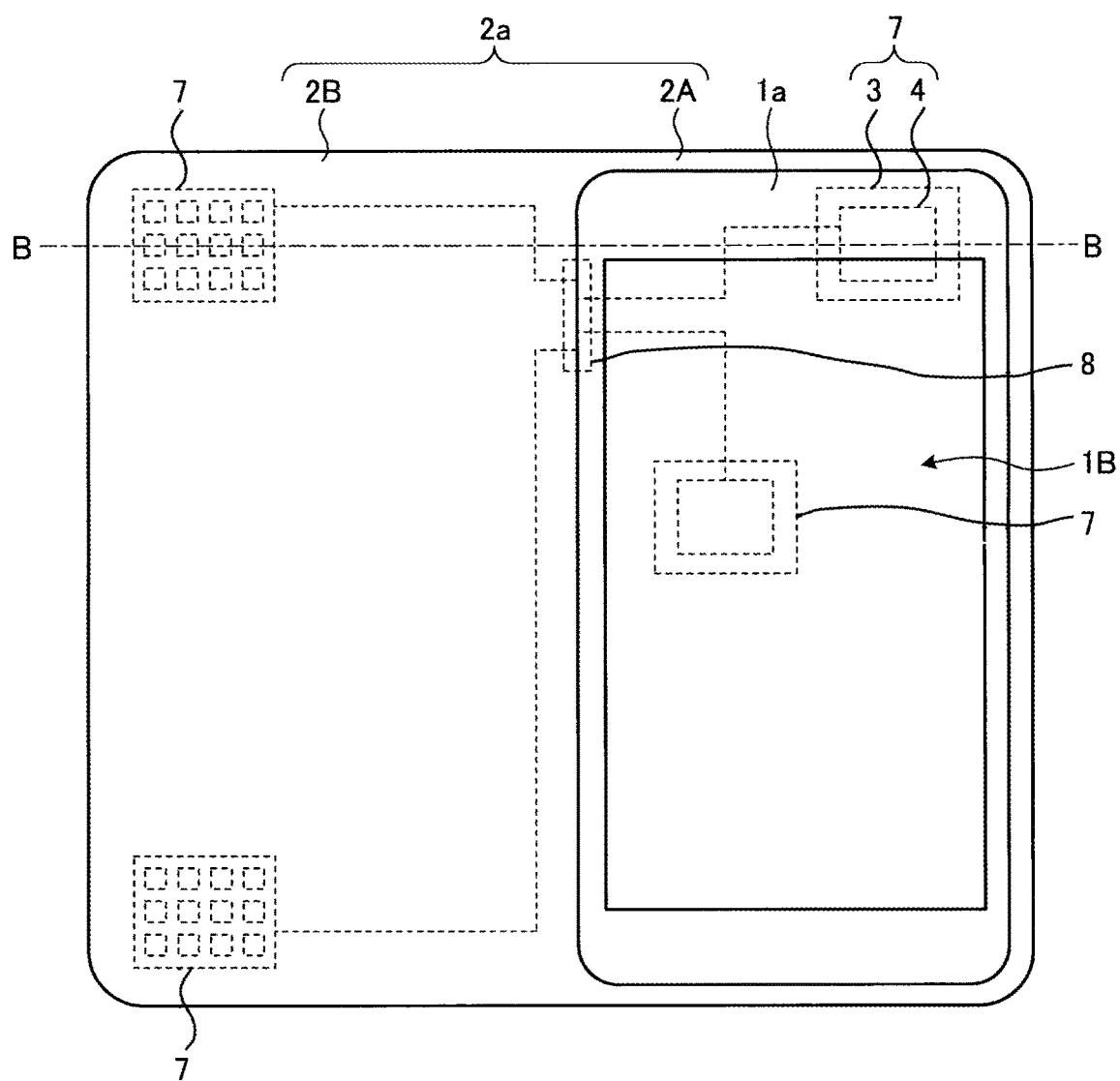
FIG. 12 is a plan view of a smartphone case and a smartphone according to Embodiment 2, illustrating an example in which the smartphone case is coupled with the smartphone.
Figure 13:
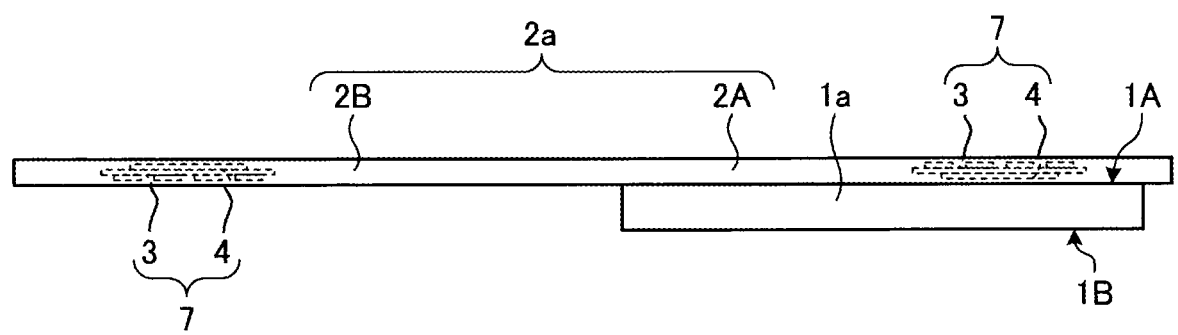
FIG. 13 is a sectional view of the smartphone case and the smartphone taken along line B-B in FIG. 12.

FIG. 12 is a plan view of the smartphone case and the smartphone according to Embodiment 2, illustrating an example in which the smartphone case is coupled with the smartphone. FIG. 13 is a sectional view of the smartphone case and the smartphone taken along line B-B in FIG. 12.

FIGS. 12 and 13 illustrate an example of the smartphone case 2a, with two RF modules 7 provided in the back surface portion 2A of the smartphone case 2a and two RF modules 7 provided in the front surface portion 2B of the smartphone case 2a. The connector 8 is connected to the individual RF modules 7 through wiring. The number of RF modules 7 in the back surface portion 2A of the smartphone case 2a is not limited to two, and the number of RF modules 7 in the front surface portion 2B of the smartphone case 2a is not limited to two.

Although FIG. 12 illustrates an example in which the connector 8 is connected to the individual RF modules 7 through wiring, the smartphone case 2a may include a switch that provides selection among the individual RF modules 7. With such a switch provided, a fewer number of connections may be included in the connector 8.

In the present embodiment, the radiation surface of each of the millimeter-wave band communication antennas 3 provided in the back surface portion 2A of the smartphone case 2a and the radiation surface of each of the millimeter-wave band communication antennas 3 provided in the front surface portion 2B of the smartphone case 2a are oriented in different directions when the smartphone case 2a is unfolded as in FIGS. 12 and 13. Specifically, when the smartphone case 2a is unfolded, each of the millimeter-wave band communication antennas 3 provided in the back surface portion 2A of the smartphone case 2a is oriented with its radiation surface on the back side in the state illustrated in FIG. 12, and each of the millimeter-wave band communication antennas 3 provided in the front surface portion 2B of the smartphone case 2a is oriented with its radiation surface on the front side in the state illustrated in FIG. 12. This layout enables the smartphone 1 to carry out satisfactory millimeter-wave band communication when the need to do so arises, that is, while the user keeps the smartphone case 2a unfolded.

As described above, one or more millimeter-wave band communication antennas 3 may be provided in the back surface portion 2A and one or more millimeter-wave band communication antennas 3 may be provided in the front surface portion 2B of the smartphone case 2a in the present embodiment. The degree of flexibility in the layout of the millimeter-wave band communication antennas 3 is higher in the present embodiment than in Embodiment 1. Providing the multiple RF modules 7 to enable millimeter-wave band communication under the MIMO scheme or under the diversity scheme will enhance the communication speed, the communication quality, and the reliability of the millimeter-wave band communication as in Embodiment 1.

Unlike Embodiment 1, the present embodiment includes RF modules 7, each of which is, as described above, a unit into which the RFIC 4 and the millimeter-wave band communication antenna 3 are combined. This configuration provides low-loss connections between the millimeter-wave band communication antennas 3 and the RFICs 4, and thus the achievable antenna gain is higher in the present embodiment than in Embodiment 1.

As illustrated in FIG. 10, the sensor 13 capable of sensing the folded state of the smartphone case 2a may be provided in the smartphone 1a, which causes the communication circuit 100 for 5G to stop carrying out the millimeter-wave band communication when the sensor 13 senses the folded state of the smartphone case 2a. Thus, the smartphone 1a carries out the millimeter-wave band communication when the need to do so arises, that is, only while the user keeps the smartphone case 2a unfolded. This leads to a reduction in power consumption and to extended battery life.

Embodiment 3

Figure 14:
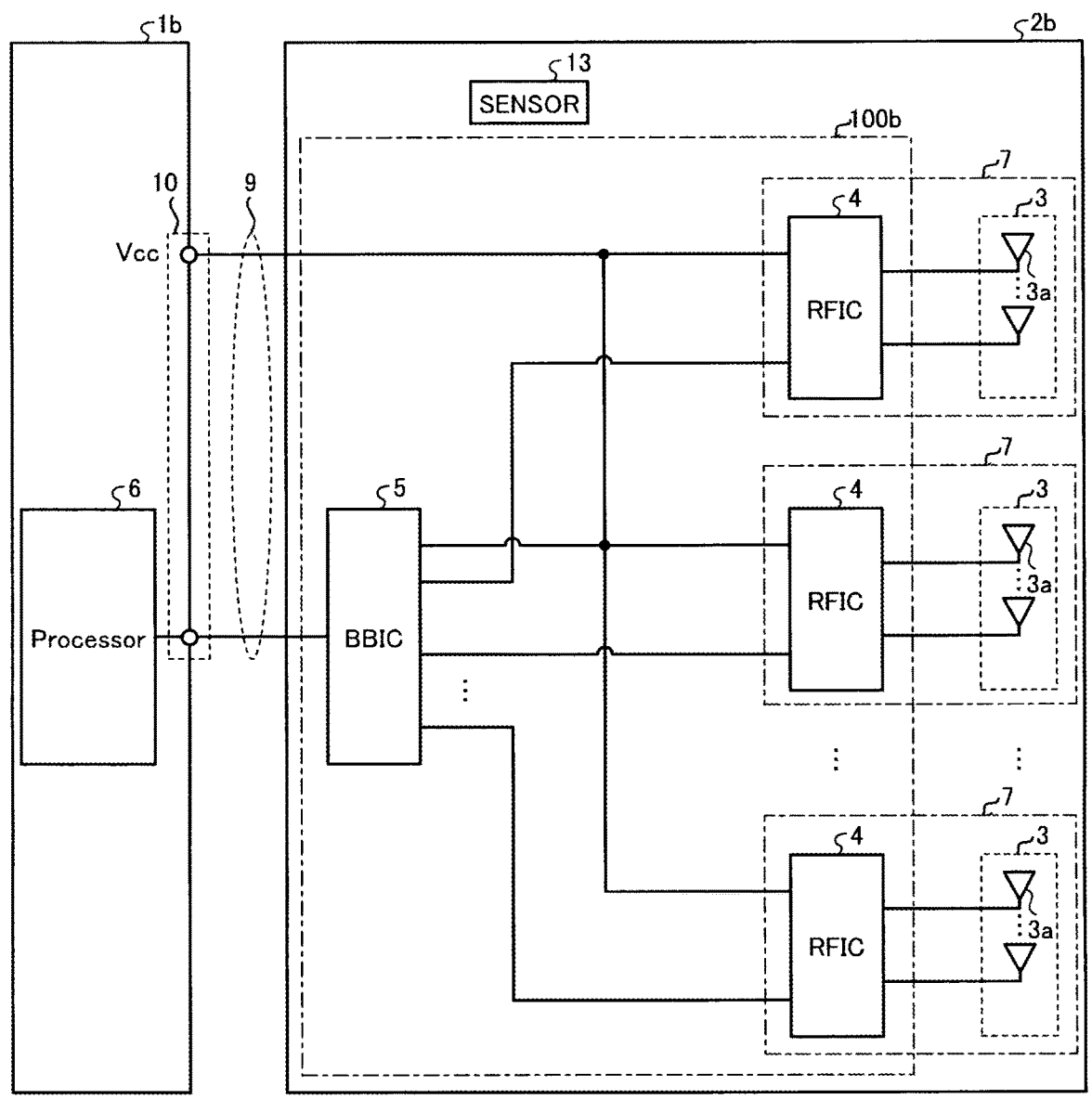
FIG. 14 is a block diagram illustrating a communication circuit for 5G millimeter-wave band communication according to Embodiment 3.

FIG. 14 is a block diagram illustrating a communication circuit for 5G millimeter-wave band communication according to Embodiment 3. A smartphone case 2b according to the present embodiment is designed to be attached to a smartphone 1b without necessarily support for 5G. In the present embodiment, the sensor 13 is provided in the smartphone case 2b.

In the present embodiment, the smartphone case 2b includes the BBIC 5 and the RF modules 7, each of which is a unit into which the millimeter-wave band communication antenna 3 and the RFIC 4 are combined. In the present embodiment, the smartphone 1b is connected to the smartphone case 2b via a high-speed serial interface 9, which is, for example, a universal serial bus (USB) interface or a Thunderbolt interface. The smartphone 1b includes a general-purpose port 10, which supports the USB interface or the Thunderbolt interface used as the high-speed serial interface 9.

Figure 15:
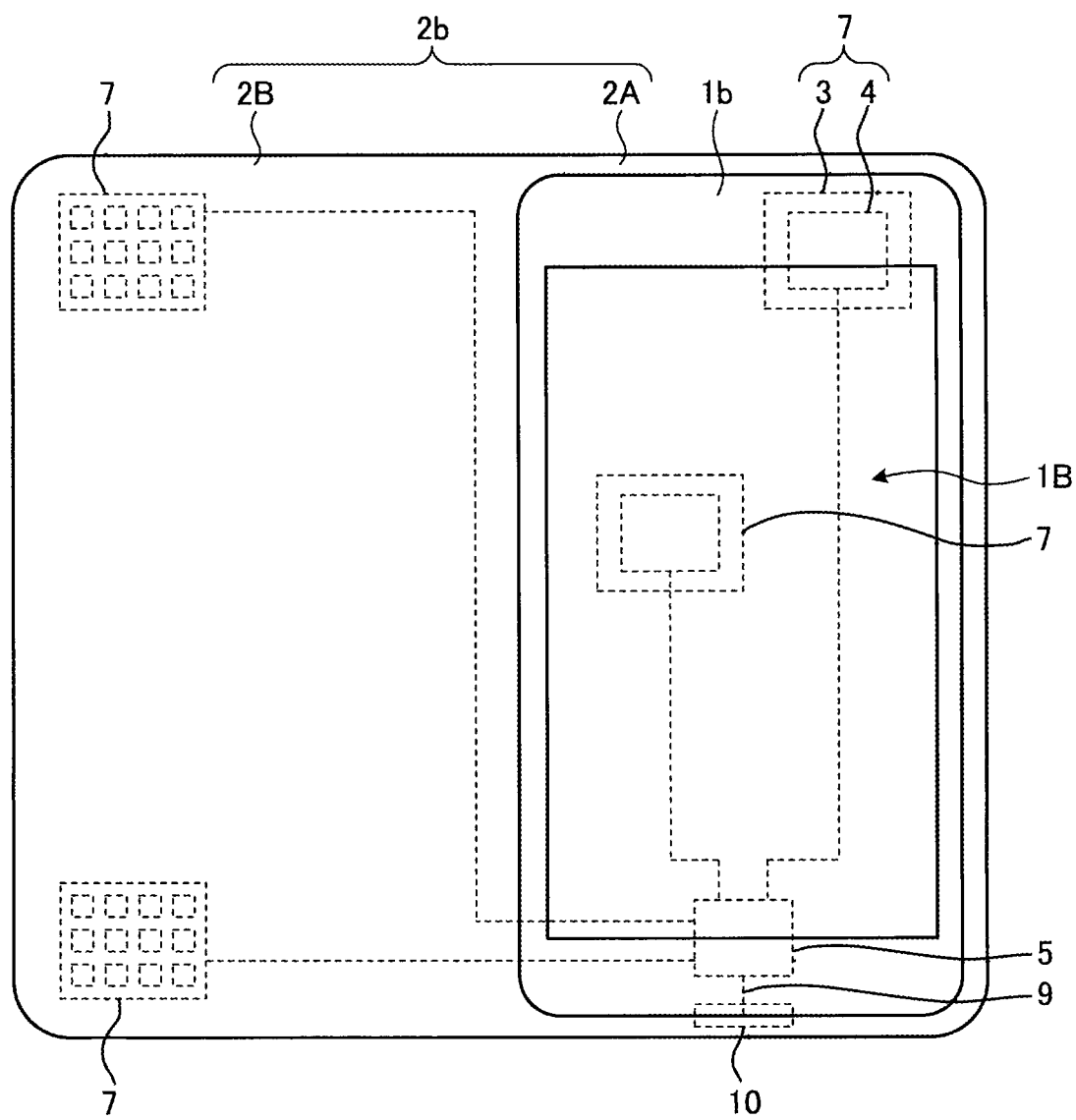
FIG. 15 is a plan view of a smartphone case and a smartphone according to Embodiment 3, illustrating a first example in which the smartphone case is coupled with the smartphone.

FIG. 15 is a plan view of the smartphone case and the smartphone according to Embodiment 3, illustrating a first example in which the smartphone case is coupled with the smartphone.

FIG. 15 illustrates an example of the smartphone case 2b, with two RF modules 7 provided in the back surface portion 2A of the smartphone case 2b and two RF modules 7 provided in the front surface portion 2B of the smartphone case 2b. In the present embodiment, the BBIC 5 is provided in the back surface portion 2A of the smartphone case 2b. The BBIC 5 is connected to the general-purpose port 10 of the smartphone 1b via the high-speed serial interface 9. The BBIC 5 is connected to the individual RF modules 7 through wiring. The number of RF modules 7 in the back surface portion 2A of the smartphone case 2b is not limited to two, and the number of RF modules 7 in the front surface portion 2B of the smartphone case 2b is not limited to two.

The smartphone case 2b in the present embodiment includes a communication circuit 100b. As described above, the communication circuit 100b includes the RF modules 7 and the BBIC 5 and are connected to the general-purpose port 10 provided in the smartphone 1b to support the USB interface or the Thunderbolt interface used as the high-speed serial interface 9. This configuration enables the smartphone 1b without necessarily support for 5G to carry out millimeter-wave band communication.

As in Embodiment 2, providing the multiple RF modules 7 to enable millimeter-wave band communication under the MIMO scheme or under the diversity scheme will enhance the communication speed, the communication quality, and the reliability of the millimeter-wave band communication.

Figure 16:
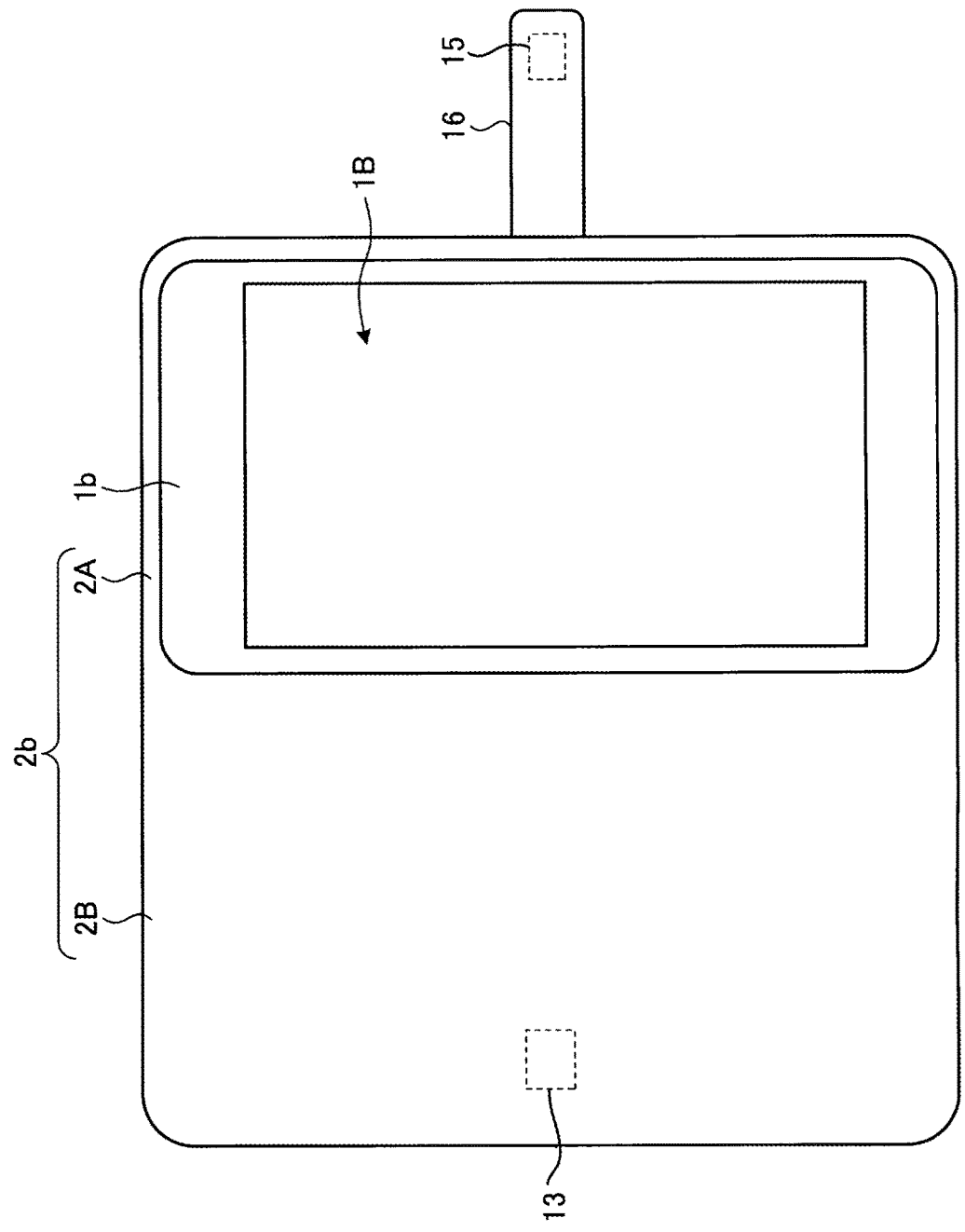
FIG. 16 is a plan view of a smartphone case and a smartphone according to Embodiment 3, illustrating a second example in which the smartphone case is coupled with the smartphone.
Figure 17:
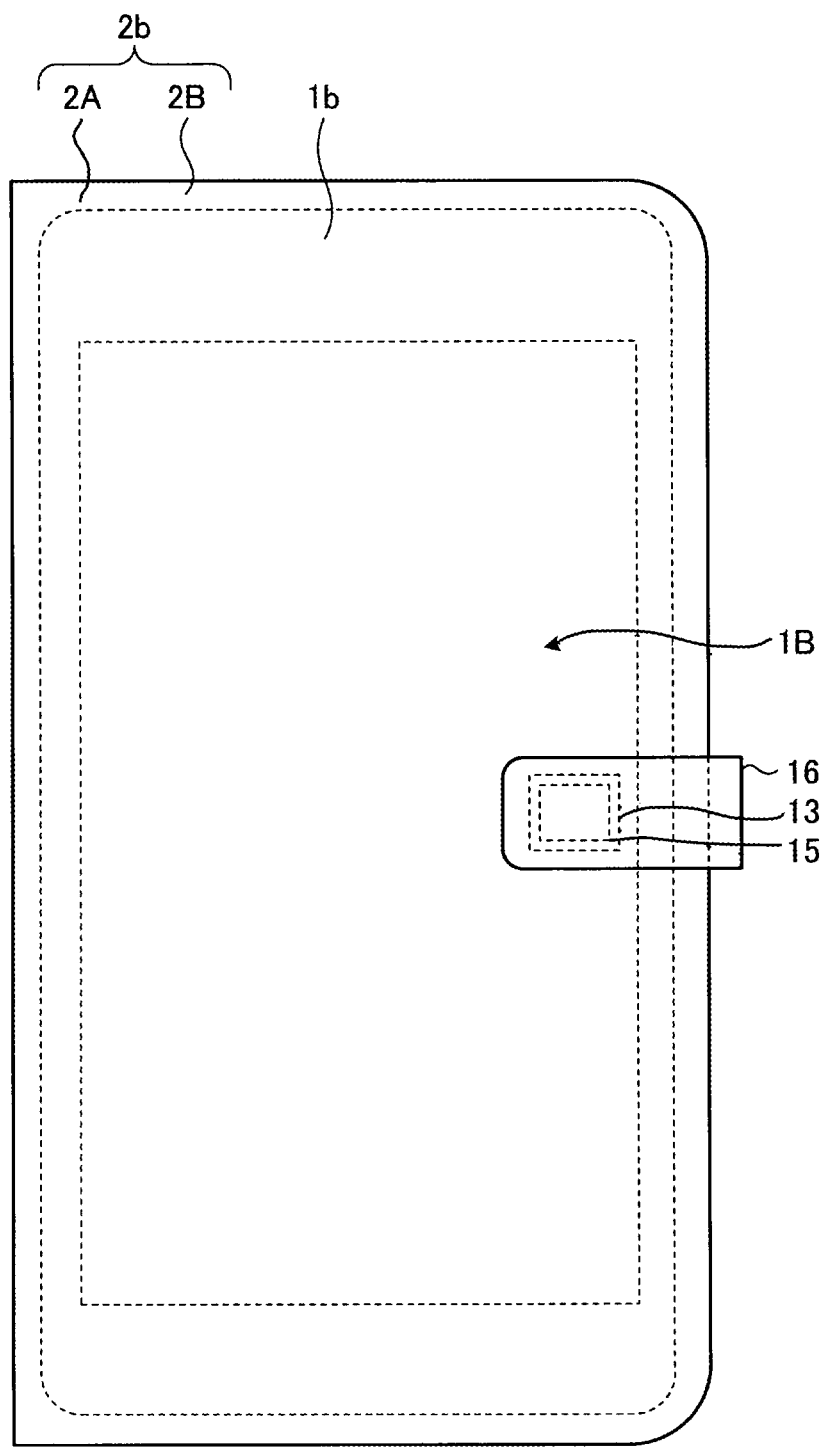
FIG. 17 is a plan view of the smartphone case in FIG. 16, illustrating its folded state.

FIG. 16 is a plan view of the smartphone case and the smartphone according to Embodiment 3, illustrating a second example in which the smartphone case is coupled with the smartphone. FIG. 17 is a plan view of the smartphone case in FIG. 16, illustrating its folded state. FIGS. 16 and 17 omit some components such as the RF modules 7 and the BBIC 5.

In each of the configurations illustrated in FIGS. 16 and 17, the smartphone case 2b includes a belt 16 for keeping the smartphone case 2b folded. The belt 16 is fixed to the back surface portion 2A of the smartphone case 2b.

In each of the configurations illustrated in FIGS. 16 and 17, the sensor 13 is a magnetic sensor embedded in the front surface portion 2B of the smartphone case 2b. When the belt 16 keeps the smartphone case 2b in the folded state as in FIG. 17, the sensor 13 detects magnetism of the magnet 15 embedded in the belt 16 and thus senses the folded state of the smartphone case 2b.

The sensor 13 is not limited to the magnetic sensor and may be any sensor that can sense the folded state of the smartphone case 2b. For example, the proximity sensor described in Embodiment 1 may be provided in the smartphone case 2b to sense the folded state of the smartphone case 2b.

When the sensor 13 senses the folded state of the smartphone case 2b, the smartphone case 2b causes the communication circuit 100b for 5G to stop carrying out the millimeter-wave band communication. Thus, the communication circuit 100b of the smartphone case 2b carries out the millimeter-wave band communication when the need to do so arises, that is, only while the user keeps the smartphone case 2b unfolded. This reduces the power consumption of the smartphone 1b and extends the life of the battery of the smartphone 1b.

Embodiment 4

Figure 18:
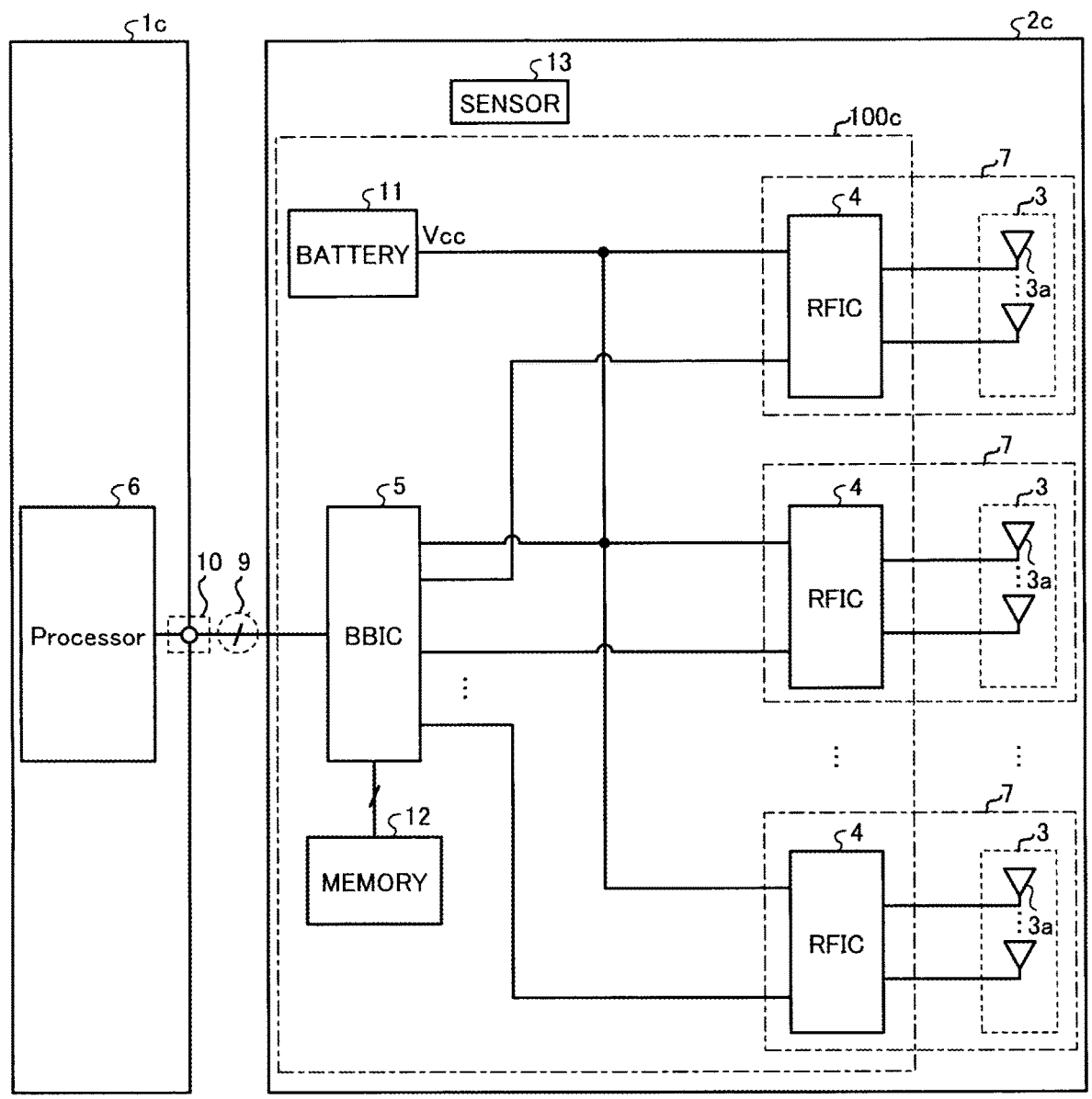
FIG. 18 is a block diagram illustrating a communication circuit for 5G millimeter-wave band communication according to Embodiment 4.

FIG. 18 is a block diagram illustrating a communication circuit for 5G millimeter-wave band communication according to Embodiment 4. In the present embodiment, the sensor 13 is provided in a smartphone case 2c as in Embodiment 3.

In the present embodiment, the smartphone case 2c includes, in addition to the components of Embodiment 3 illustrated in FIG. 14, a battery 11 and a memory 12.

The battery 11 supplies power to components of a communication circuit 100c. The battery 11 may be configured as a "mobile battery" so as to be capable of charging the battery of a smartphone 1c.

The memory 12 is a buffer memory that makes adjustment by performing buffering on input to and output from the BBIC 5 when the transmission speed of the high-speed serial interface 9 is lower than the maximum speed of input to and output from the BBIC 5.

Figure 19:
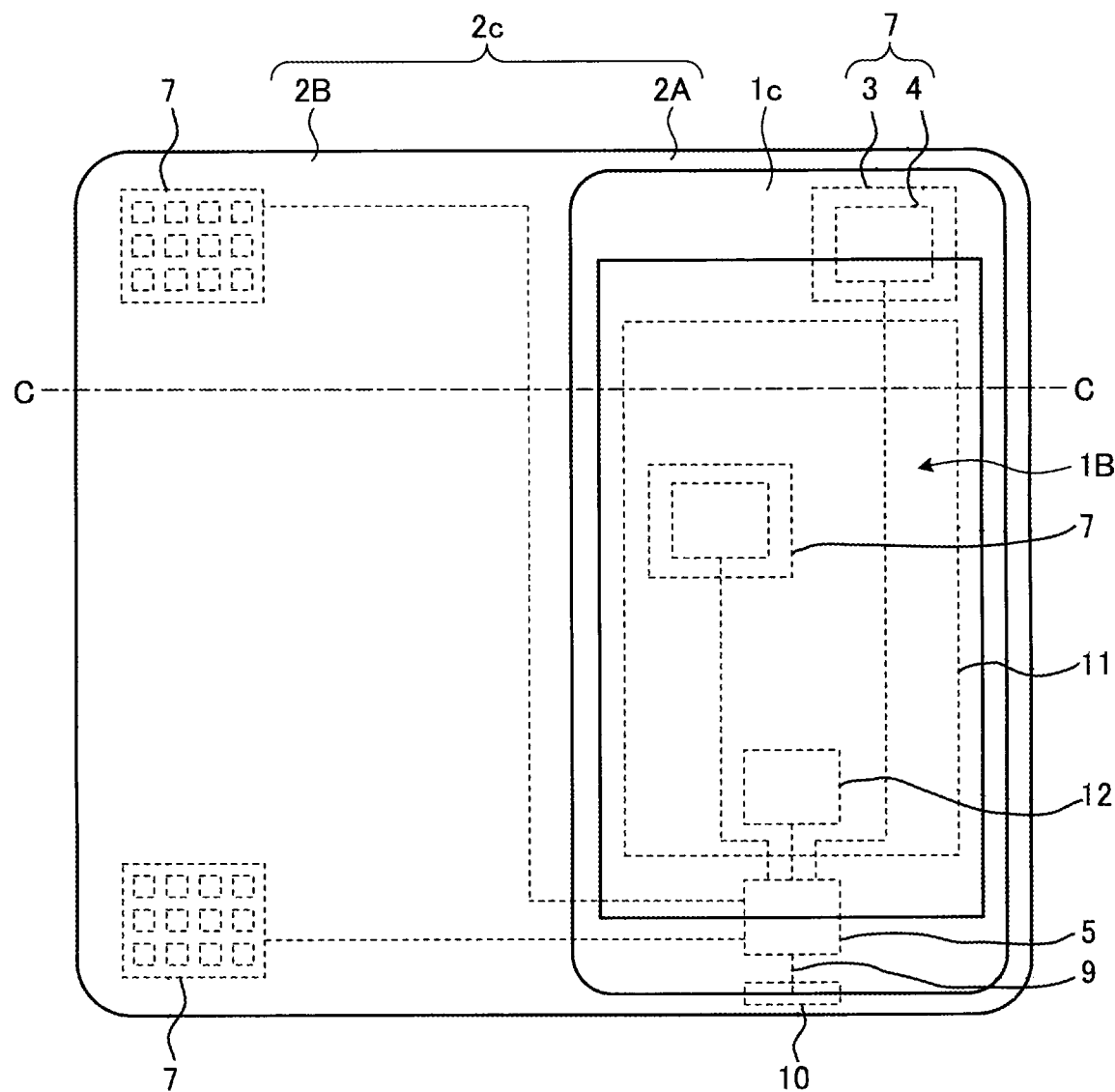
FIG. 19 is a plan view of a smartphone case and a smartphone according to Embodiment 4, illustrating an example in which the smartphone case is coupled with the smartphone.
Figure 20:
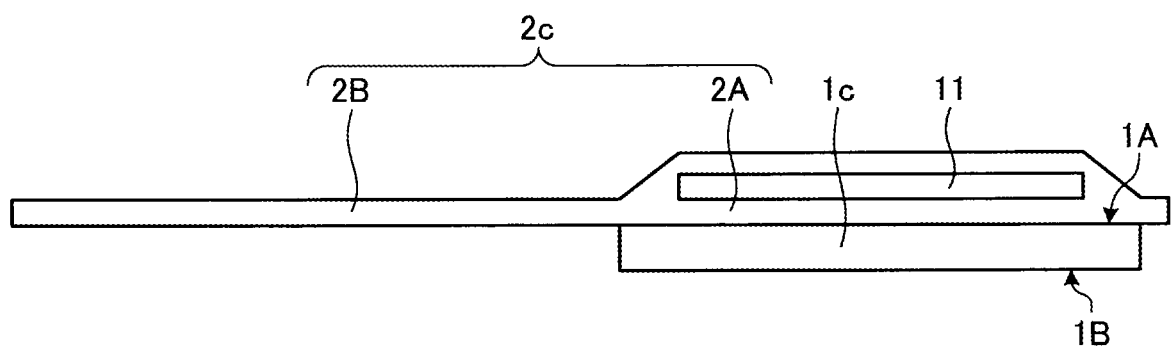
FIG. 20 is a sectional view of the smartphone case and the smartphone taken along line C-C in FIG. 19.

FIG. 19 is a plan view of the smartphone case and the smartphone according to Embodiment 4, illustrating an example in which the smartphone case is coupled with the smartphone. FIG. 20 is a sectional view of the smartphone case and the smartphone taken along line C-C in FIG. 19.

FIGS. 19 and 20 illustrate an example of the smartphone case 2c, with two RF modules 7 provided in the back surface portion 2A of the smartphone case 2c and two RF modules 7 provided in the front surface portion 2B of the smartphone case 2c. In the present embodiment, the BBIC 5, the battery 11, and the memory 12 are provided in the back surface portion 2A of the smartphone case 2c. The BBIC 5 is connected to the general-purpose port 10 of the smartphone 1c via the high-speed serial interface 9. The BBIC 5 is connected to the individual RF modules 7 through wiring. The BBIC 5 is connected to the memory 12 through, for example, a dedicated memory bus. The number of RF modules 7 in the back surface portion 2A of the smartphone case 2*c* is not limited to two, and the number of RF modules 7 in the front surface portion 2B of the smartphone case 2*c* is not limited to two. Although FIGS. 18 to 20 illustrate the configuration in which the communication circuit 100*c* includes both the battery 11 and the memory 12, the communication circuit 100*c* may omit the battery 11 or the memory 12.

Providing the battery 11 in the smartphone case 2*c* will enable the smartphone 1*c* to carry out millimeter-wave band communication with slow battery drain. The battery 11 configured as a mobile battery will extend the life of the battery of the smartphone 1*c*.

Providing the memory 12 will enable stable millimeter-wave band communication uninfluenced by the transmission speed of the high-speed serial interface 9.

As in Embodiments 2 and 3, providing the multiple RF modules 7 to enable millimeter-wave band communication under the MIMO scheme or under the diversity scheme will enhance the communication speed, the communication quality, and the reliability of the millimeter-wave band communication.

As illustrated in FIG. 18, the sensor 13 capable of sensing the folded state of the smartphone case 2*c* may be provided in the smartphone case 2*c*, which causes the communication circuit 100*c* for 5G to stop carrying out the millimeter-wave band communication when the sensor 13 senses the folded state of the smartphone case 2*c*. Thus, the communication circuit 100*c* of the smartphone case 2*c* carries out the millimeter-wave band communication when the need to do so arises, that is, only while the user keeps the smartphone case 2*c* unfolded. This reduces the power consumption and extends the life of the battery 11.

Embodiment 5

Figure 21:
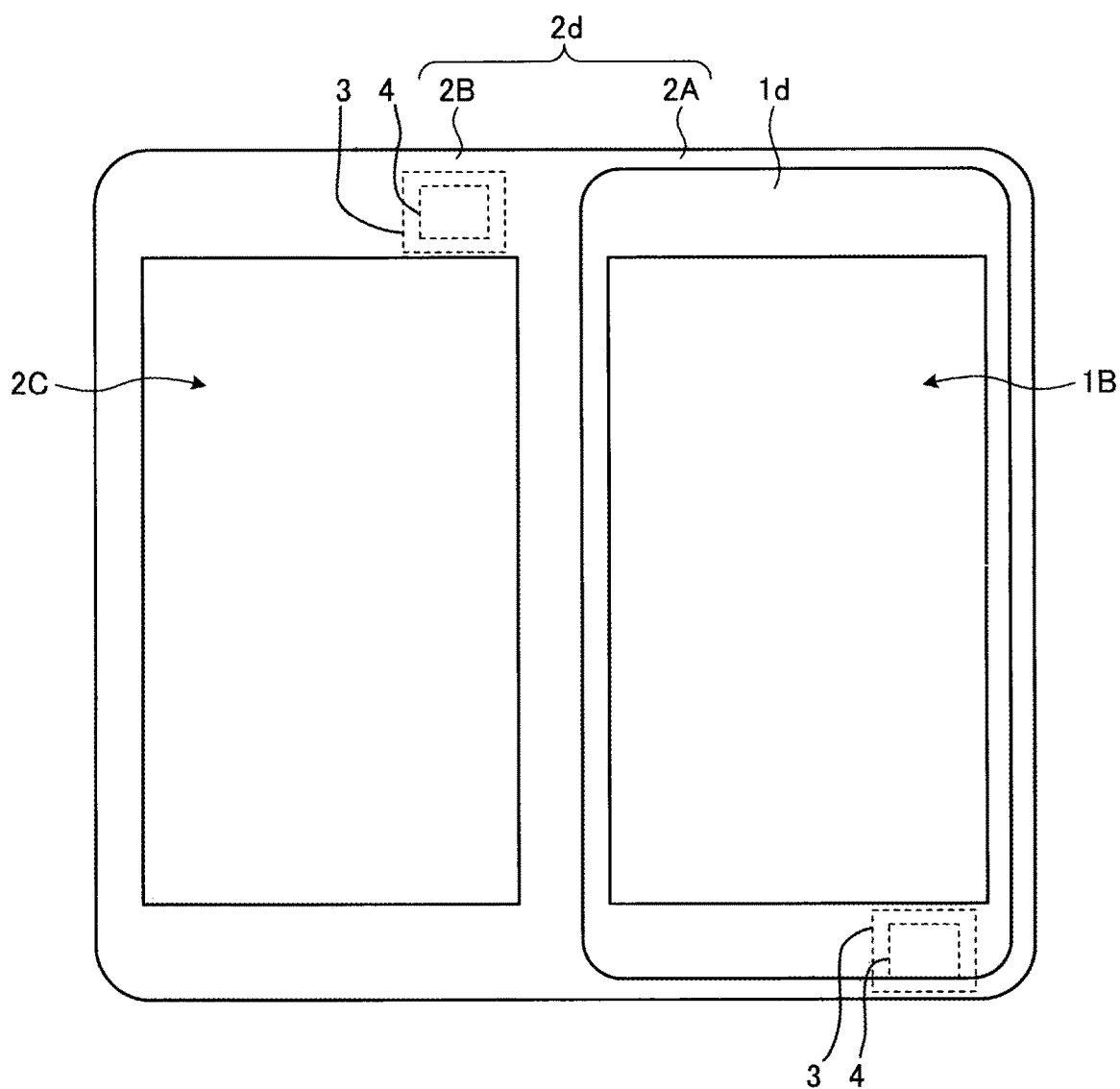
FIG. 21 is a plan view of a smartphone case and a smartphone according to Embodiment 5, illustrating an example in which the smartphone case is coupled with the smartphone.
Figure 22:
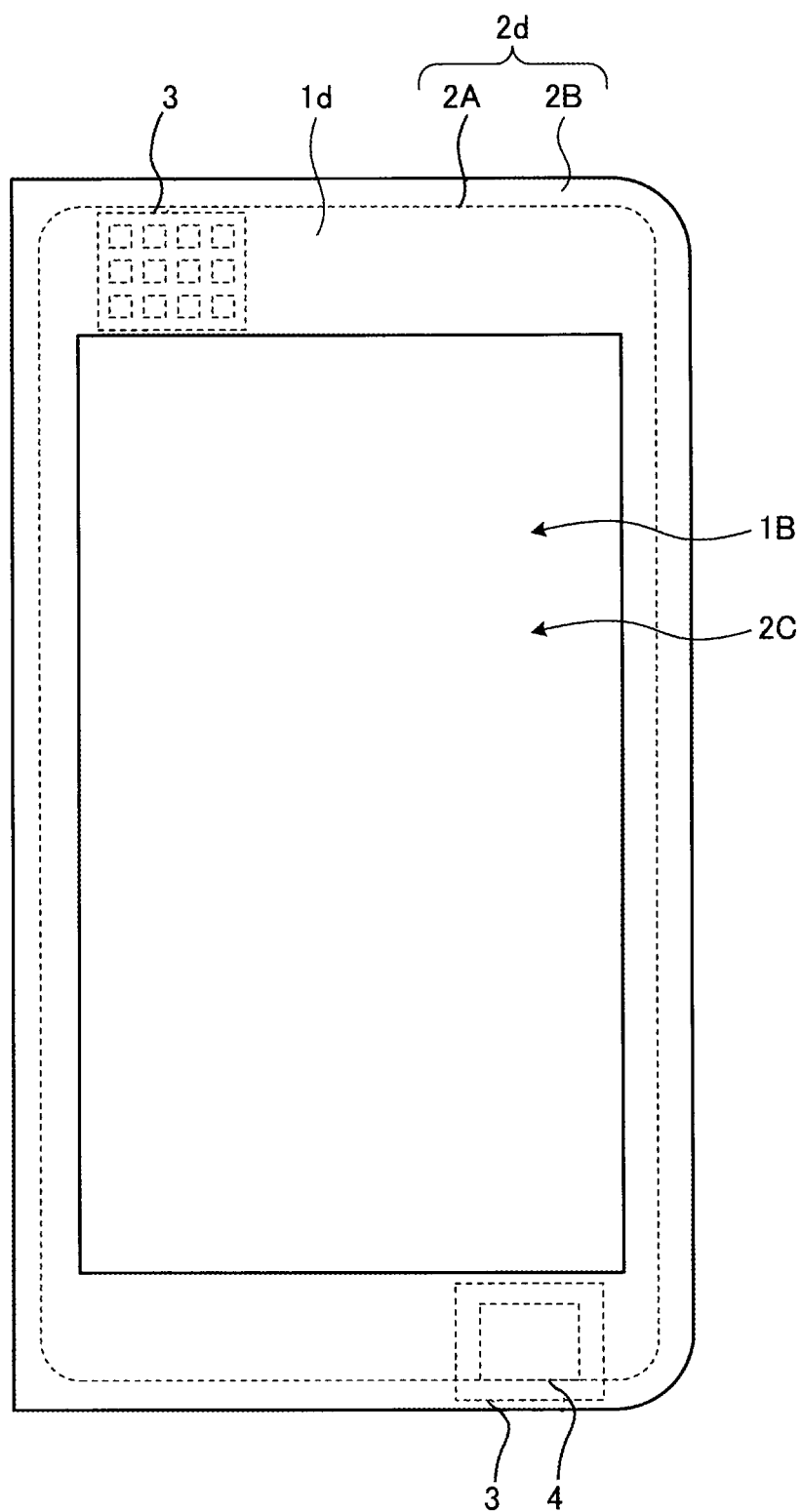
FIG. 22 is a plan view of the smartphone case in FIG. 21, illustrating its folded state.

FIG. 21 is a plan view of a smartphone case and a smartphone according to Embodiment 5, illustrating an example in which the smartphone case is coupled with the smartphone. FIG. 22 is a plan view of the smartphone case in FIG. 21, illustrating its folded state.

FIGS. 21 and 22 illustrate an example in which one millimeter-wave band communication antenna 3 is provided in the back surface portion 2A of a smartphone case 2*d* and one millimeter-wave band communication antenna 3 is provided in the front surface portion 2B of the smartphone case 2*d*. In the present embodiment, an opening 2C is provided in the front surface portion 2B of the smartphone case 2*d*, which corresponds to the display surface 1B of the smartphone 1*d* when the smartphone case 2*d* is in the folded state. Owing to this configuration, millimeter-wave band communication may be carried out when the smartphone case 2*d* is in the folded state.

In the present embodiment, the radiation surface of the millimeter-wave band communication antenna 3 provided in the back surface portion 2A of the smartphone case 2*d* and the radiation surface of the millimeter-wave band communication antenna 3 provided in the front surface portion 2B of the smartphone case 2*d* are oriented in different directions when the smartphone case 2*d* is in the folded state as in FIG. 22. Specifically, when the smartphone case 2*d* is in the folded state, the millimeter-wave band communication antenna 3 provided in the back surface portion 2A of the smartphone case 2*d* is oriented with its radiation surface on the back side in the state illustrated in FIG. 22, and the millimeter-wave band communication antenna 3 provided in the front surface portion 2B of the smartphone case 2*d* is oriented with its radiation surface on the front side in the state illustrated in FIG. 22. Owing to this configuration, the smartphone 1*d* may carry out satisfactory millimeter-wave band communication even when the smartphone case 2*d* is in the folded state as in FIG. 22.

Embodiment 6

Figure 23:
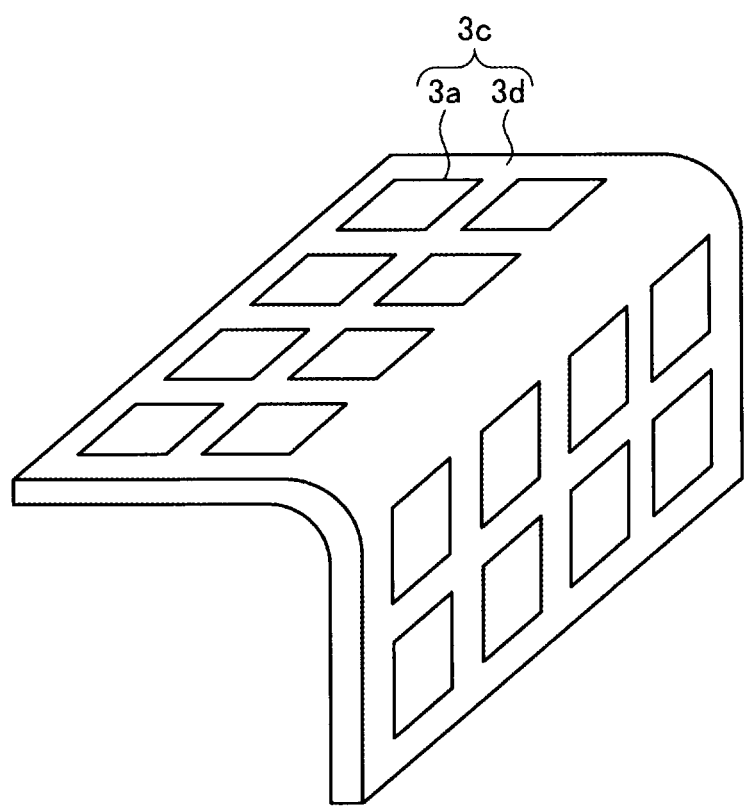
FIG. 23 is a perspective view of an exemplary millimeter-wave band communication antenna according to Embodiment 6.

FIG. 23 is a perspective view of an exemplary millimeter-wave band communication antenna according to Embodiment 6.

As illustrated in FIG. 23, a millimeter-wave band communication antenna 3*c* in the present embodiment is an array antenna including the patch antennas 3*a* arranged on a surface of a flexible substrate 3*d*. Each patch antenna 3*a* is a radiation conductor disposed on the surface of the flexible substrate 3*d*, which is so flexible that it can be bent as desired.

An RF module is constructed in such a manner that the RFIC 4 is disposed on a back surface of the flexible substrate 3*d*, that is, the RFIC 4 is disposed on the surface opposite to the surface on which the patch antennas 3*a* are disposed.

Although the patch antennas 3*a* illustrated in FIG. 23 are arranged in a four-by-four matrix, the matrix size of the patch antennas 3*a* may be varied. For example, the patch antennas 3*a* arranged in two two-by-four matrices may be provided.

FIGS. 24 to 28 illustrate example layouts of one or more millimeter-wave band communication antennas 3*c*.

Figure 24:
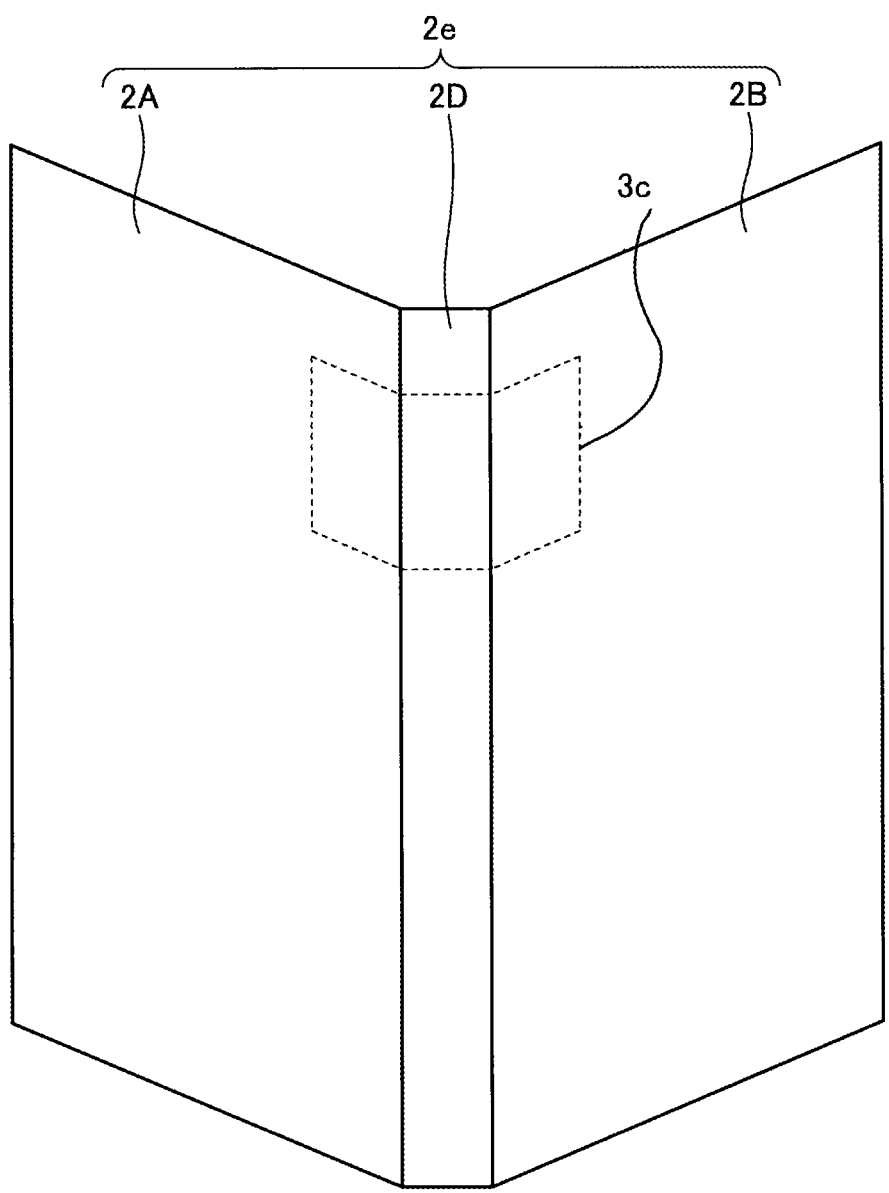
FIG. 24 illustrates a first example layout of the millimeter-wave band communication antenna according to Embodiment 6.

FIG. 24 illustrates a first example layout of the millimeter-wave band communication antenna according to Embodiment 6. FIG. 24 illustrates an example in which one millimeter-wave band communication antenna 3*c* is provided so as to extend from the back surface portion 2A to the front surface portion 2B across a side surface portion 2D of a smartphone case 2*e*.

Figure 25:
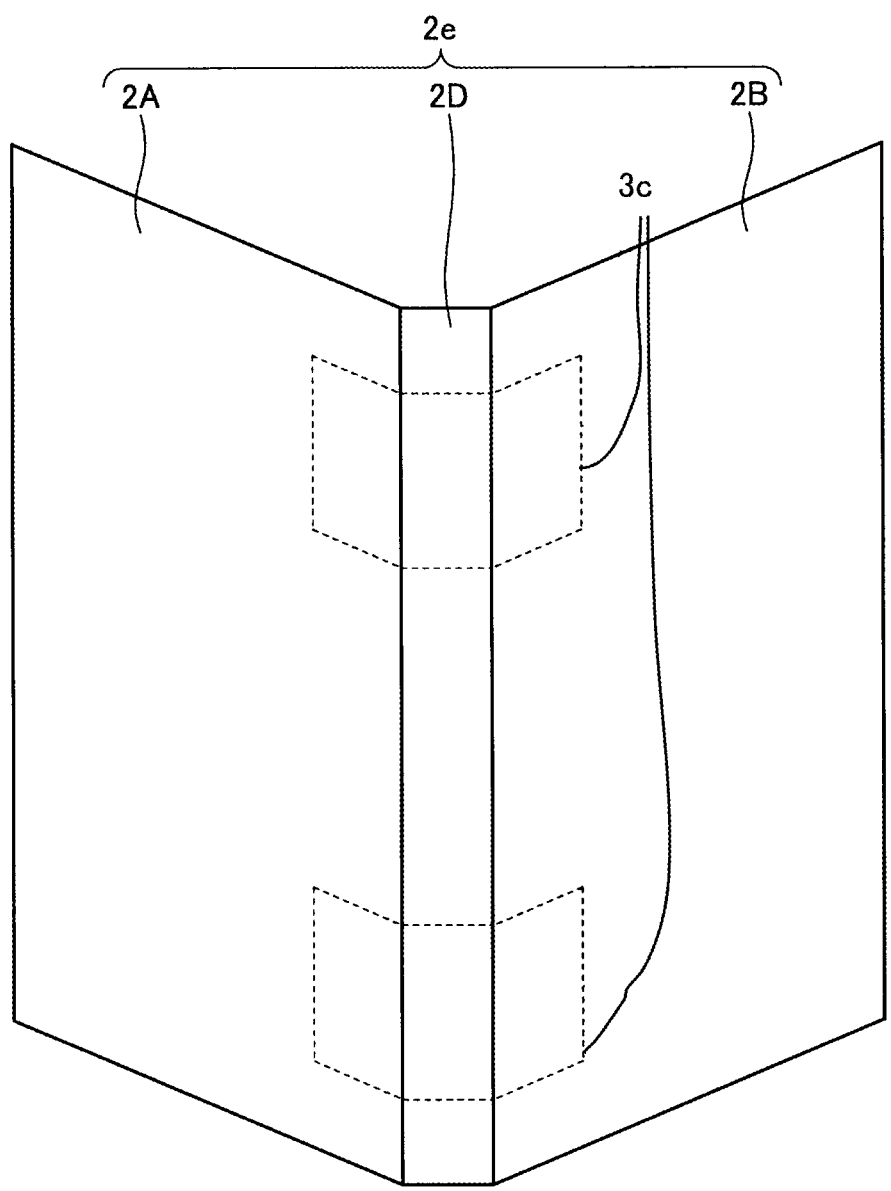
FIG. 25 illustrates a second example layout of the millimeter-wave band communication antennas according to Embodiment 6.

FIG. 25 illustrates a second example layout of the millimeter-wave band communication antennas according to Embodiment 6. FIG. 25 illustrates an example in which two millimeter-wave band communication antennas 3*c* are provided so as to extend from the back surface portion 2A to the front surface portion 2B across the side surface portion 2D of the smartphone case 2*e*.

Figure 26:
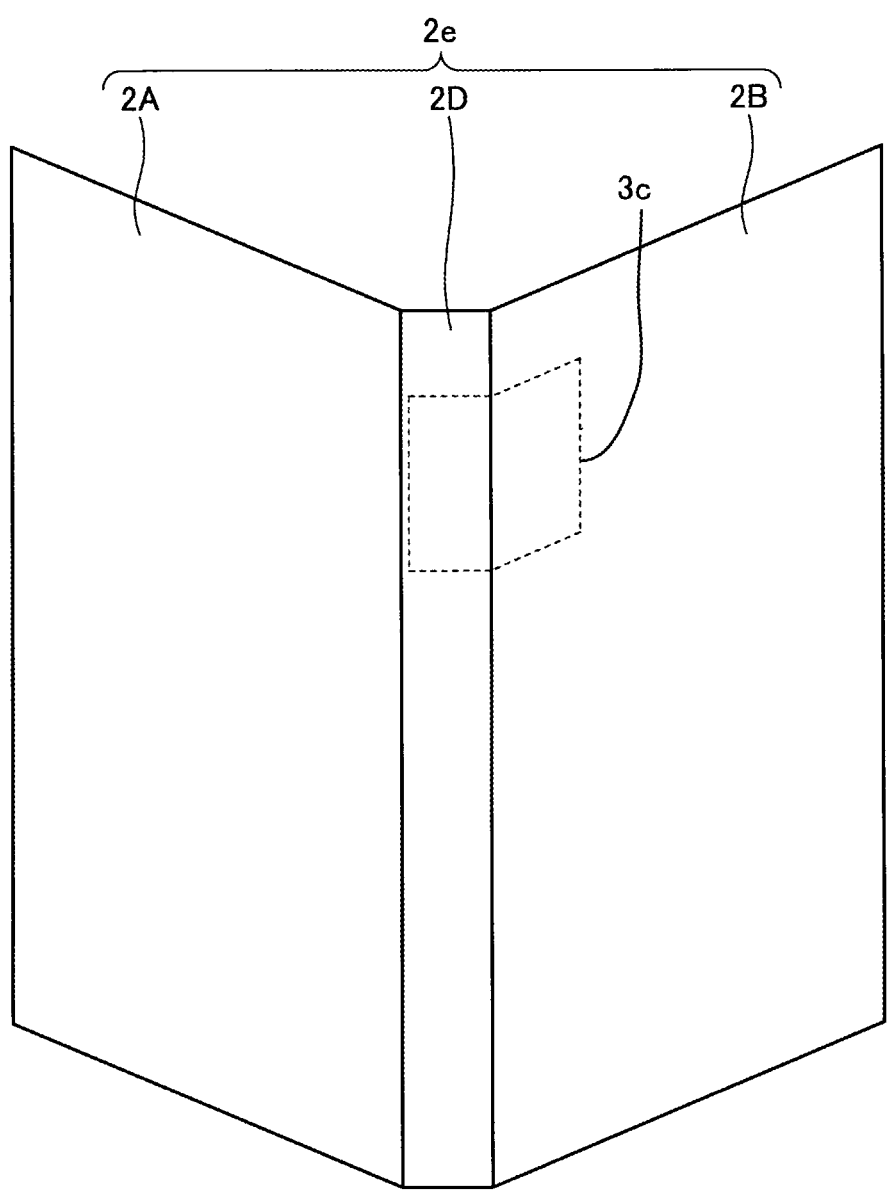
FIG. 26 illustrates a third example layout of the millimeter-wave band communication antenna according to Embodiment 6.

FIG. 26 illustrates a third example layout of the millimeter-wave band communication antenna according to Embodiment 6. FIG. 26 illustrates an example in which one millimeter-wave band communication antenna 3*c* is provided so as to extend from the side surface portion 2D to the front surface portion 2B of the smartphone case 2*e*.

Figure 27:
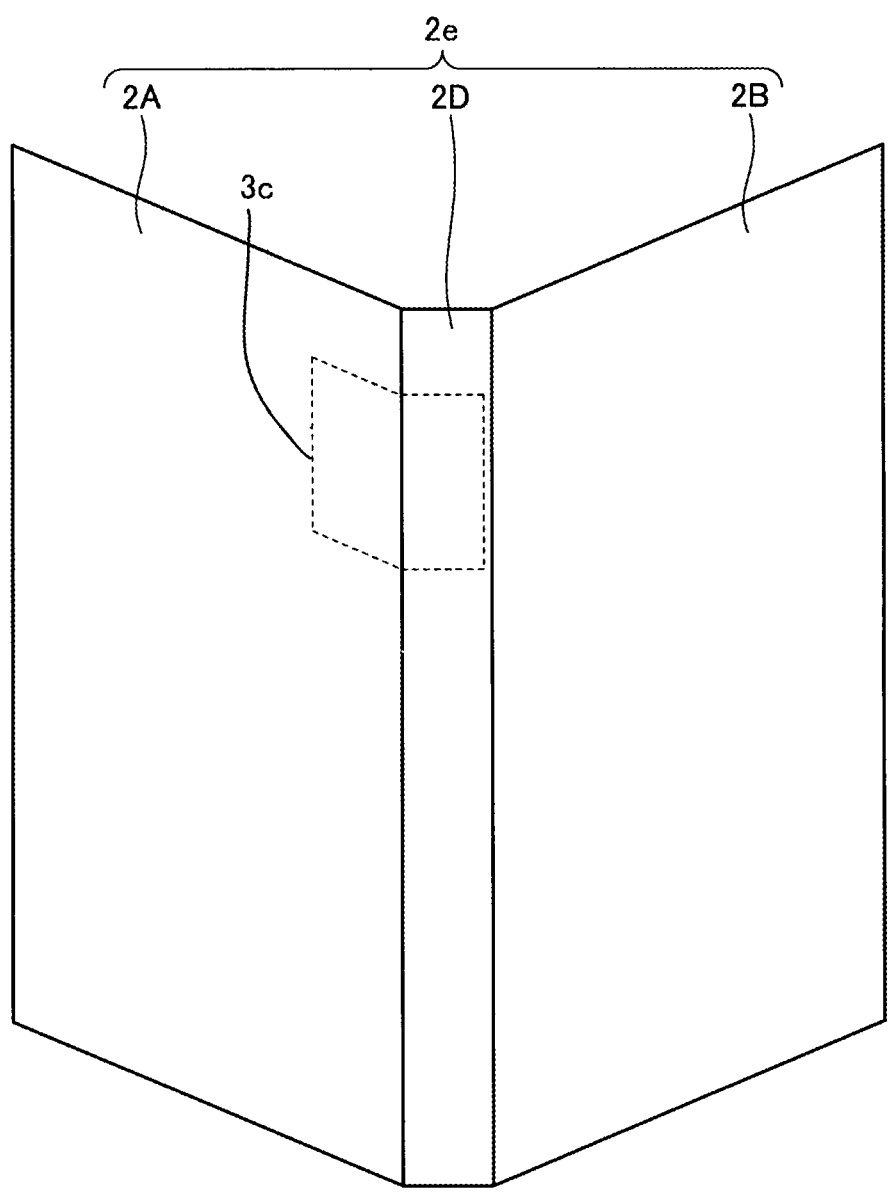
FIG. 27 illustrates a fourth example layout of the millimeter-wave band communication antenna according to Embodiment 6.

FIG. 27 illustrates a fourth example layout of the millimeter-wave band communication antenna according to Embodiment 6. FIG. 27 illustrates an example in which one millimeter-wave band communication antenna 3*c* is provided so as to extend from the back surface portion 2A to the side surface portion 2D of the smartphone case 2*e*.

Figure 28:
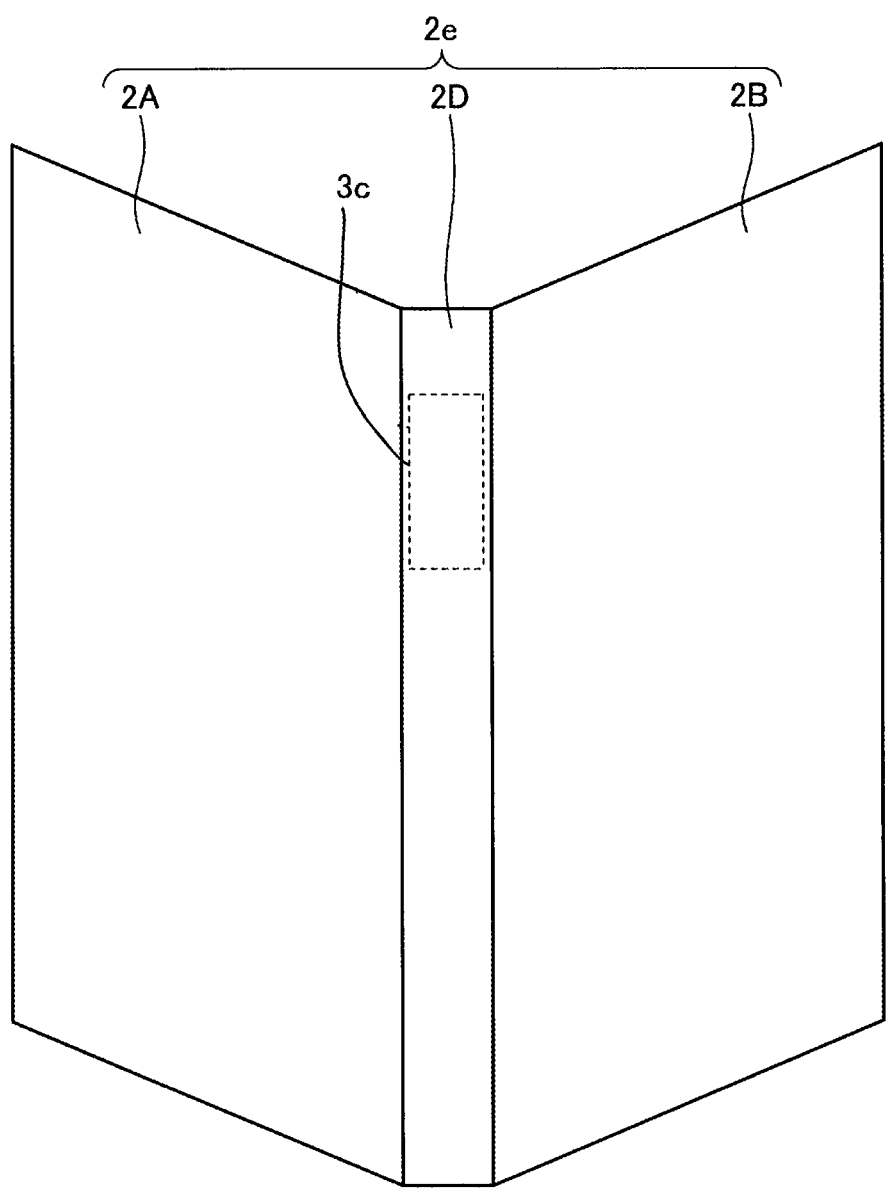
FIG. 28 illustrates a fifth example layout of the millimeter-wave band communication antenna according to Embodiment 6.

FIG. 28 illustrates a fifth example layout of the millimeter-wave band communication antenna according to Embodiment 6. FIG. 28 illustrates an example in which one millimeter-wave band communication antenna 3*c* is provided in the side surface portion 2D of the smartphone case 2*e*.

The number and position of the millimeter-wave band communication antennas 3*c* illustrated in FIGS. 24 to 28 may be varied. For example, three or more millimeter-wave band communication antennas 3*c* may be provided.

Embodiment 7

Figure 29:
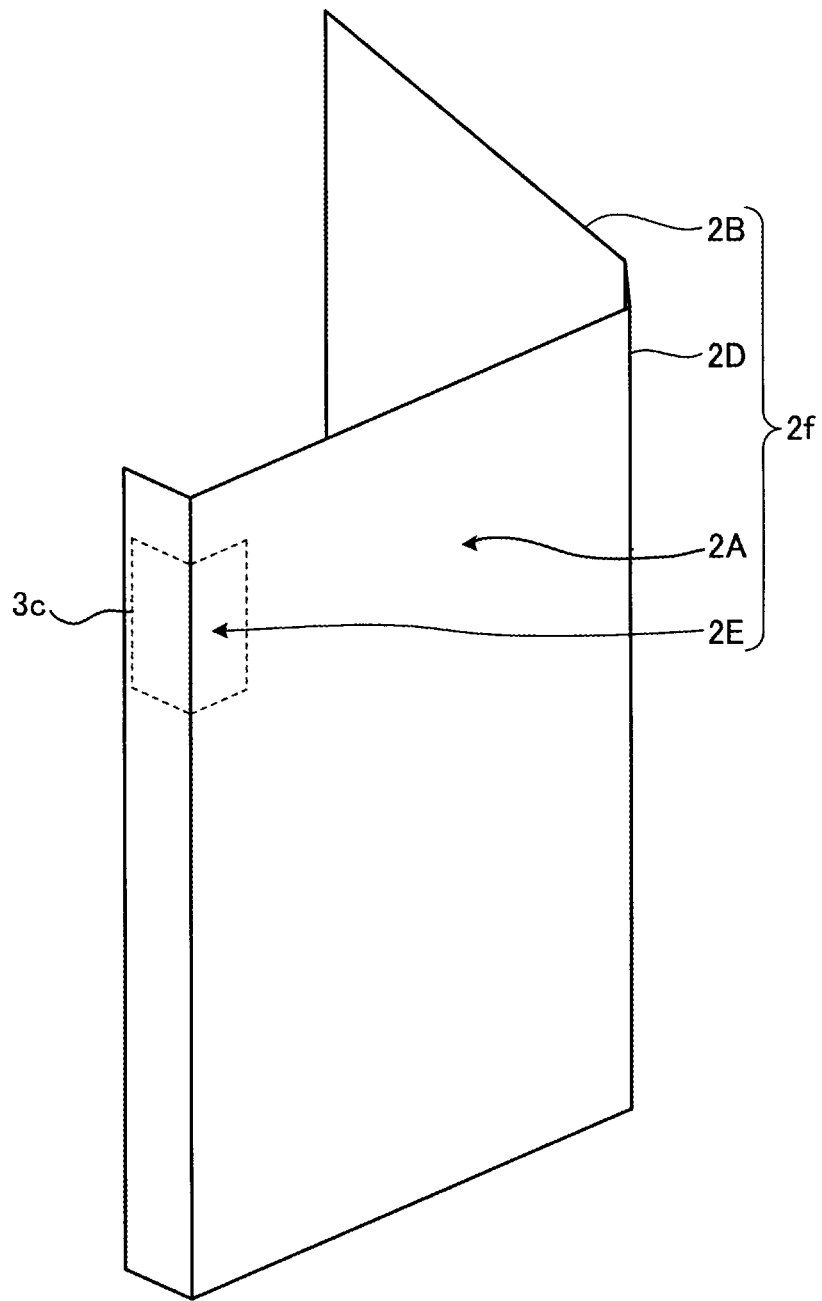
FIG. 29 illustrates an example layout of a millimeter-wave band communication antenna according to Embodiment 7.

FIG. 29 illustrates an example layout of a millimeter-wave band communication antenna according to Embodiment 7. FIG. 29 illustrates an example in which one millimeter-wave band communication antenna 3c is provided in a corner portion 2E formed by folding an end portion of the back surface portion 2A of a smartphone case 2f.

The number and position of the millimeter-wave band communication antennas 3c may be varied. Unlike the case with one millimeter-wave band communication antenna 3c in FIG. 29, two or more millimeter-wave band communication antennas 3c may be provided. One or more millimeter-wave band communication antennas 3c may be provided in a corner portion formed by folding an end portion of the front surface portion 2B of the smartphone case 2f.

Embodiment 8

Figure 30A:
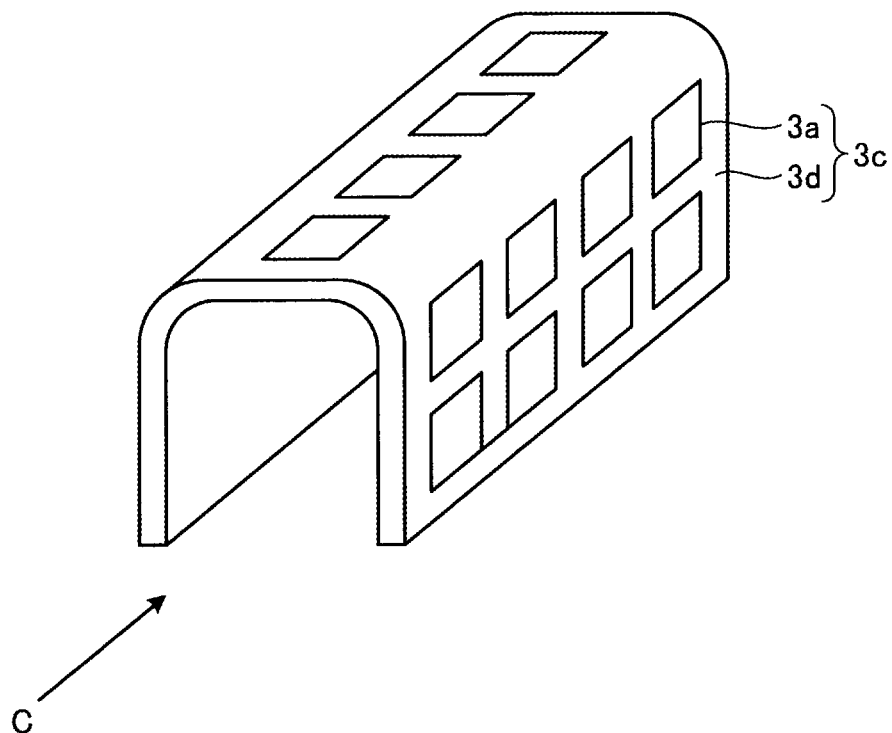
FIG. 30A is a perspective view of an exemplary millimeter-wave band communication antenna according to Embodiment 8.
Figure 30B:
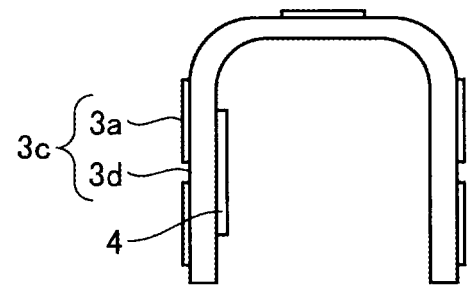
FIG. 30B is a view of the millimeter-wave band communication antenna illustrated in FIG. 30A and seen in the direction of the arrow C.

FIG. 30A is a perspective view of an exemplary millimeter-wave band communication antenna according to Embodiment 8. FIG. 30B is a view of the millimeter-wave band communication antenna illustrated in FIG. 30A and seen in the direction of the arrow C.

As illustrated in FIG. 30A, the millimeter-wave band communication antenna 3c in the present embodiment is an array antenna including the patch antennas 3a arranged on the surface of the flexible substrate 3d as in Embodiments 6 and 7. As illustrated in FIG. 30B, the millimeter-wave band communication antenna 3c according to the present embodiment is substantially U-shaped when seen in the direction of the arrow C in FIG. 30A.

As illustrated in 30B, an RF module is constructed in such a manner that the RFIC 4 is disposed on the back surface of the flexible substrate 3d, that is, the RFIC 4 is disposed on the surface opposite to the surface on which the patch antennas 3a are disposed.

Although the patch antennas 3a illustrated in FIG. 30A are arranged in a five-by-four matrix and disposed on three surfaces forming a substantially U-shaped profile, the matrix size of the patch antennas 3a may be varied. For example, the patch antennas 3a may be arranged in two two-by-four matrices on respective two surfaces that are included in the surfaces forming the substantially U-shaped profile and are opposed to each other.

Figure 31:
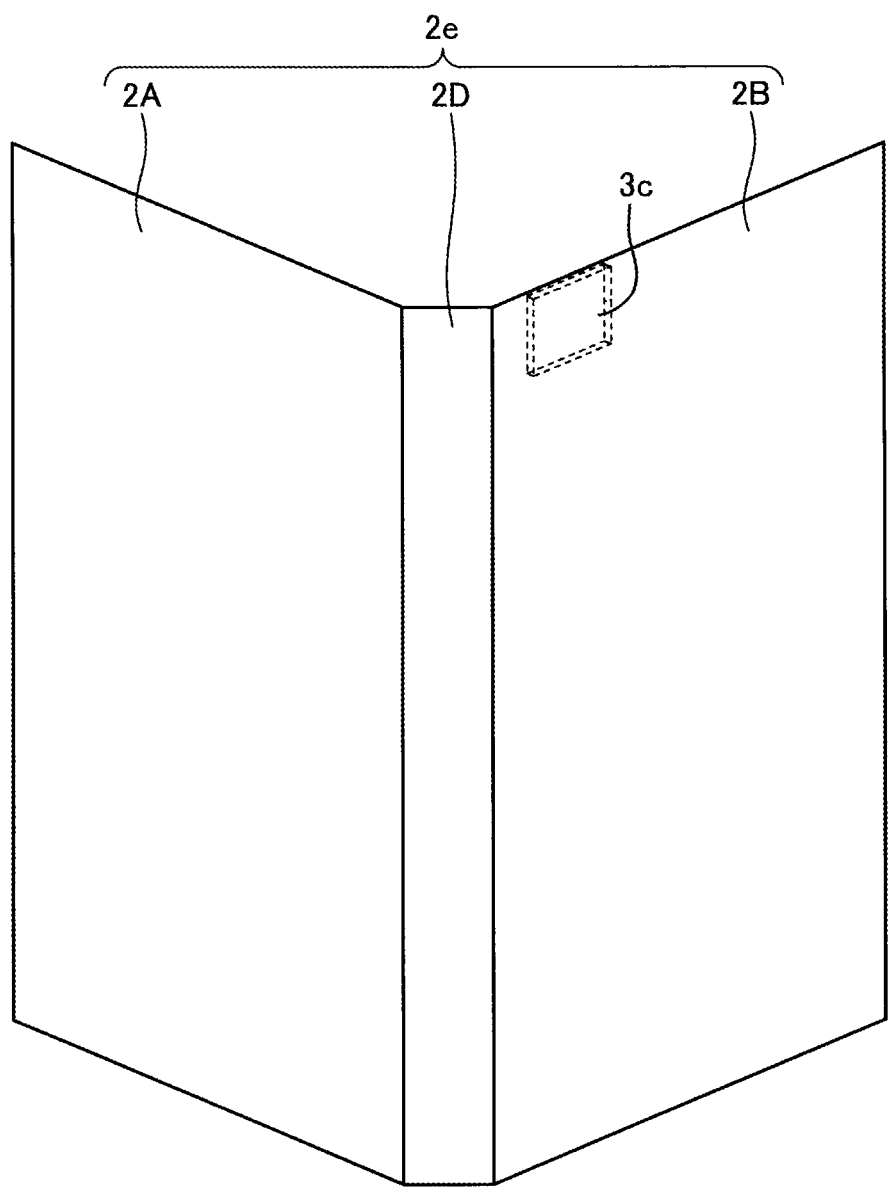
FIG. 31 illustrates an example layout of the millimeter-wave band communication antenna according to Embodiment 8.

FIG. 31 illustrates an example layout of the millimeter-wave band communication antenna 3c. FIG. 31 illustrates an example layout of the millimeter-wave band communication antenna according to Embodiment 8. FIG. 31 illustrates an example in which the millimeter-wave band communication antenna 3c is disposed so as to sandwich the base material (not illustrated) of the front surface portion 2B of the smartphone case 2e.

The number and position of the millimeter-wave band communication antennas 3c may be varied. Unlike the case with one millimeter-wave band communication antenna 3c in FIG. 31, two or more millimeter-wave band communication antennas 3c may be provided.

Embodiment 9

Figure 32:
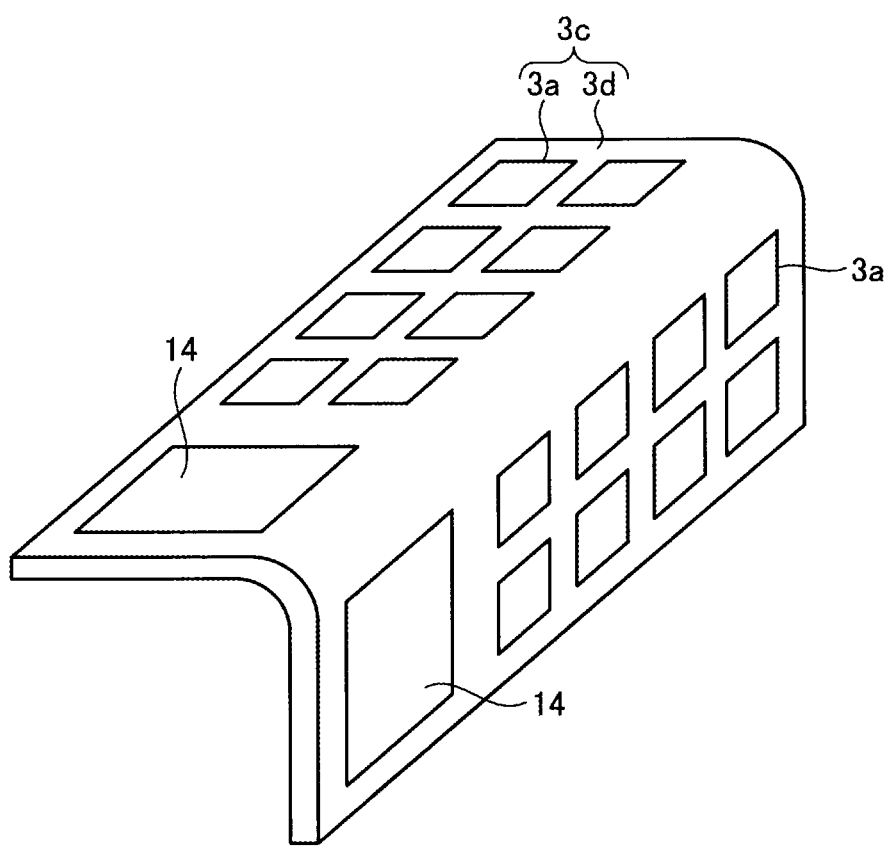
FIG. 32 is a perspective view of exemplary millimeter-wave band communication antennas according to Embodiment 9.

FIG. 32 is a perspective view of exemplary millimeter-wave band communication antennas according to Embodiment 9.

As illustrated in FIG. 32, each of the millimeter-wave band communication antennas 3c in the present embodiment is an array antenna including the patch antennas 3a arranged on the surface of the flexible substrate 3d. Each patch antenna 3a is a radiation conductor disposed on the surface of the flexible substrate 3d, which is so flexible that it can be bent as desired.

An RF module is constructed in such a manner that the RFIC 4 is disposed on the back surface of the flexible substrate 3d, that is, the RFIC 4 is disposed on the surface opposite to the surface on which the patch antennas 3a are disposed.

In the present embodiment, an obstacle detection sensor 14 is disposed on the surface on which the patch antennas 3a are disposed.

The obstacle detection sensor 14 is, for example, an ultrasonic sensor. Alternatively, the obstacle detection sensor 14 may be, for example, an infrared sensor. Still alternatively, the obstacle detection sensor 14 may be an ultrasonic sensor, an infrared sensor, a radio wave sensor, or varying combinations of two or more of these sensors. An antenna may serve as a radio wave sensor when the voltage standing wave ratio (VSWR) at the input port of the antenna exceeds or falls below a threshold value. In this case, the millimeter-wave band communication antenna 3c may double as a sensor. Alternatively, another antenna may be provided to serve as a sensor.

The obstacle detection sensor 14 detects an obstacle (e.g., a desk, a hand) located in the radiation direction of the millimeter-wave band communication antenna 3c. When the obstacle detection sensor 14 detects an obstacle, the RFIC 4 emits no radio waves from the millimeter-wave band communication antenna 3c. This means that millimeter-wave band communication is stopped. As a result, unnecessary power consumption may be reduced.

Although the patch antennas 3a of each millimeter-wave band communication antenna 3c illustrated in FIG. 32 are arranged in a two-by-four matrix, the matrix size of the patch antennas 3a may be varied. The patch antennas 3a illustrated in FIG. 32 are disposed on the surface of the flexible substrate 3d. Alternatively, the patch antennas 3a may be arranged on the surface of the dielectric substrate 3b described in Embodiment 1 and may be provided with the obstacle detection sensor 14.

Embodiment 10

Figure 33:
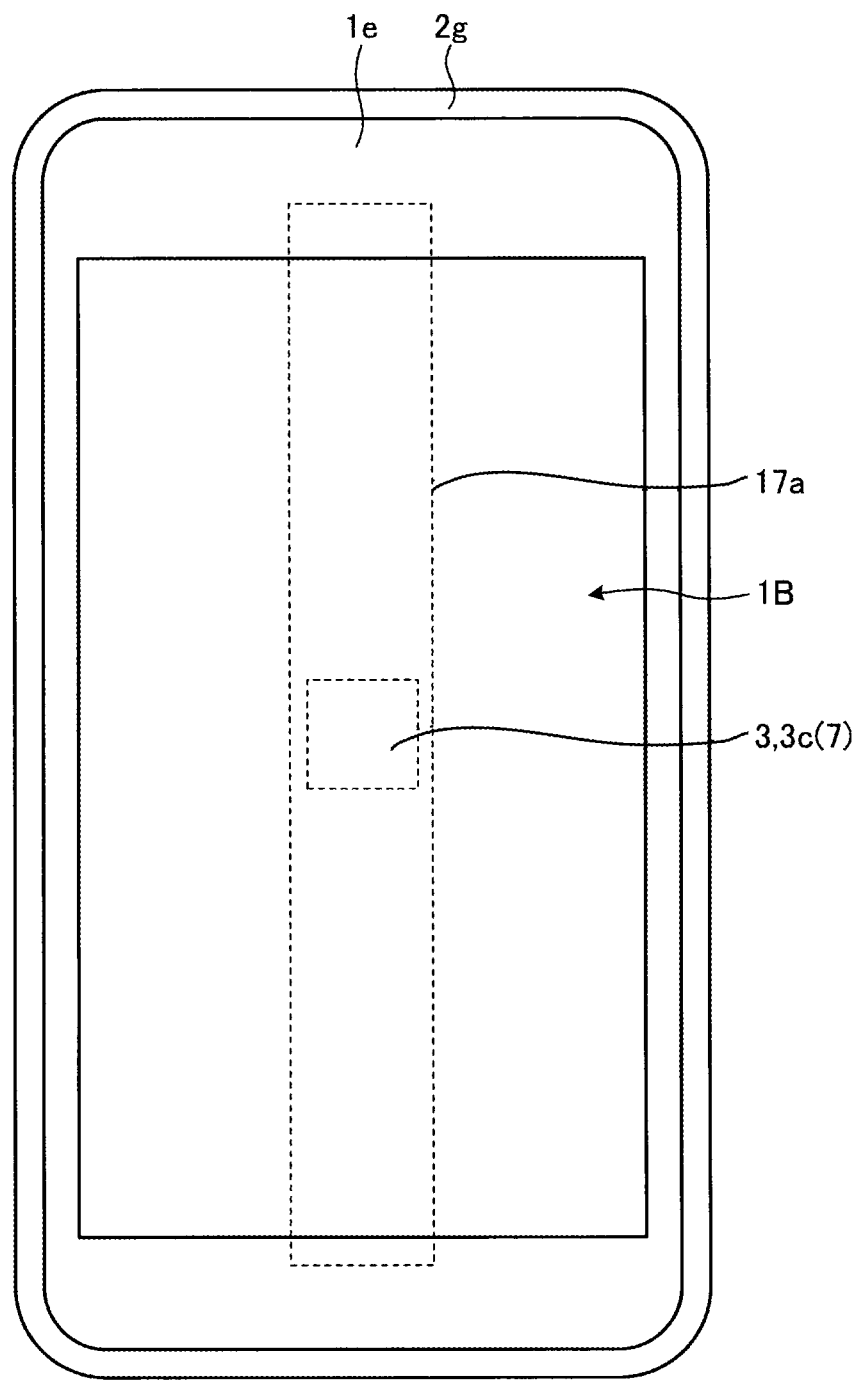
FIG. 33 is a plan view of a smartphone case of a first example of Embodiment 10.
Figure 34:
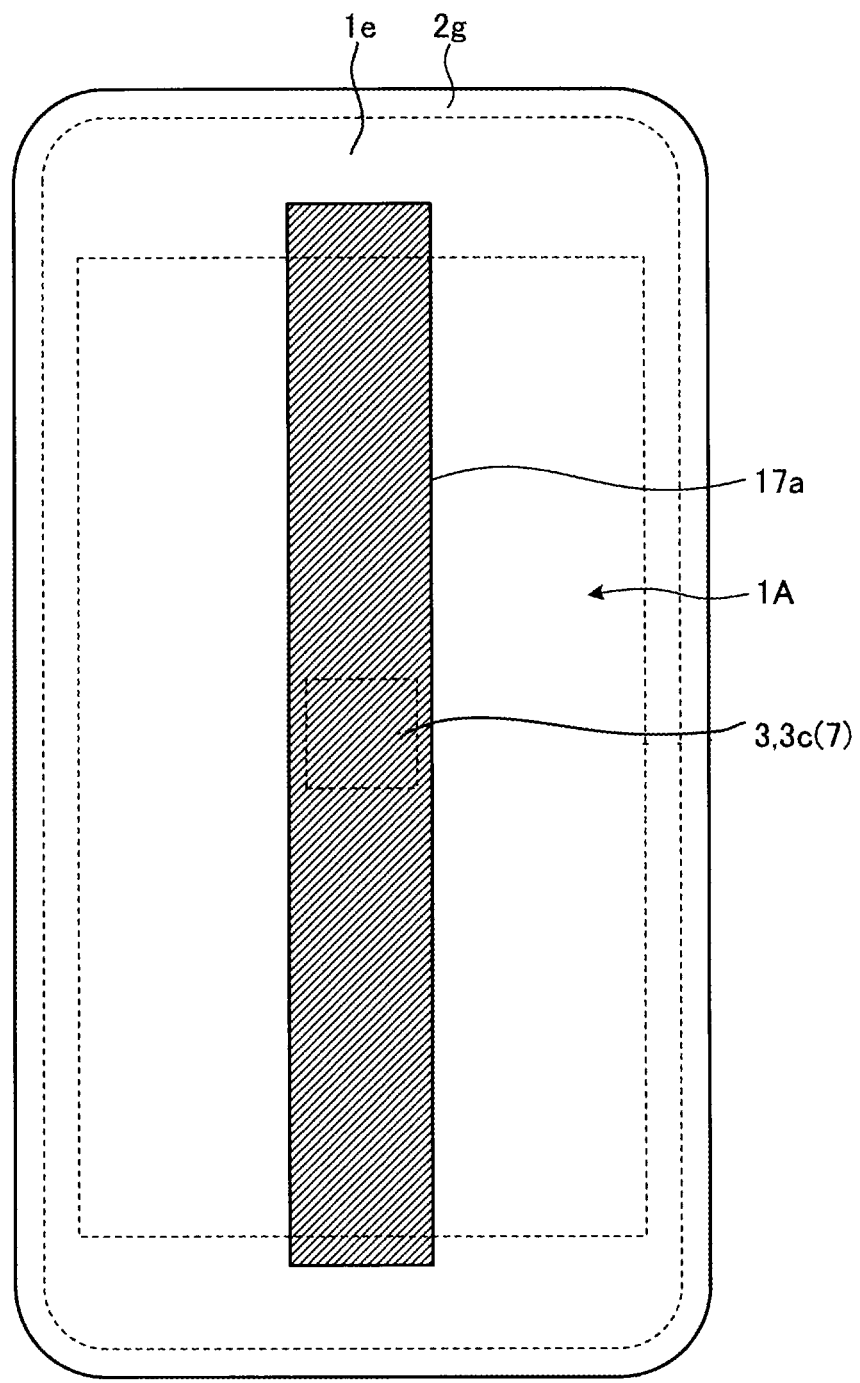
FIG. 34 is a back view of the smartphone case in FIG. 33.
Figure 35:
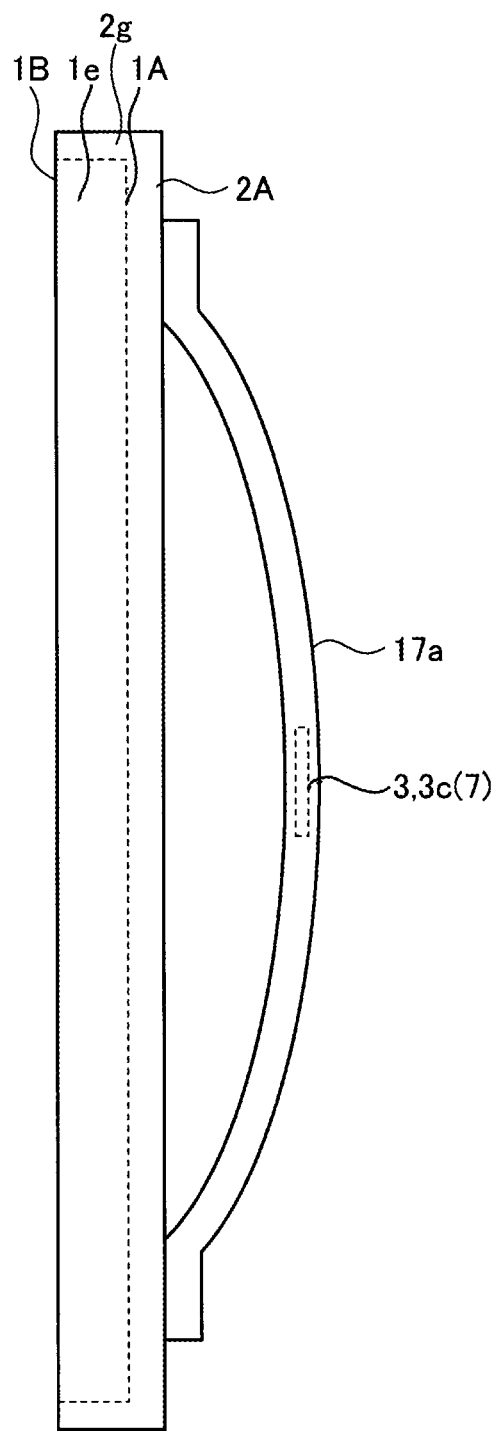
FIG. 35 is a side view of the smartphone case in FIG. 33.

FIG. 33 is a plan view of a smartphone case of a first example of Embodiment 10. FIG. 34 is a back view of the smartphone case in FIG. 33. FIG. 35 is a side view of the smartphone case in FIG. 33.

As illustrated in FIGS. 33 to 35, a smartphone case 2g, which is the first example of Embodiment 10, includes a band-shaped holding portion 17a on the back surface 1A.

As illustrated in FIGS. 33 to 35, the millimeter-wave band communication antenna 3 or 3c (or the RF module 7) in the first example of Embodiment 10 are embedded in the band-shaped holding portion 17a. Although the millimeter-wave band communication antenna 3 or 3c (or the RF module 7) may be fixed in any position within the hatched area illustrated in FIG. 34, the millimeter-wave band communication antenna 3 or 3c (or the RF module 7) can be fixed to the midsection in the longitudinal direction.

The smartphone case 2g, which is the first example of Embodiment 10 illustrated in FIGS. 33 to 35, is designed to be held in the palm of a hand interposed between the back surface 1A of the smartphone case 2g and the band-shaped holding portion 17a.

Given this, the millimeter-wave band communication antenna 3 or 3c (or the RF module 7) may be fixed in any position within the hatched area of the band-shaped holding portion 17a illustrated in FIG. 34. This configuration eliminates or reduces the possibility that the use's hand holding the smartphone case 2g will become an obstacle that may deteriorate the communication quality of millimeter-wave band communication. As illustrated in FIGS. 33 and 34, the millimeter-wave band communication antenna 3 or 3c (or the RF module 7) can be fixed to the midsection of the band-shaped holding portion 17a in the longitudinal direction. Although FIGS. 33 to 35 illustrate an example in which one millimeter-wave band communication antenna 3 or 3c (or one RF module 7) is fixed to the midsection of the band-shaped holding portion 17a, more than one millimeter-wave band communication antennas 3 or 3c (or more than one RF modules 7) may be arranged in the longitudinal direction of the band-shaped holding portion 17a.

Figure 36:
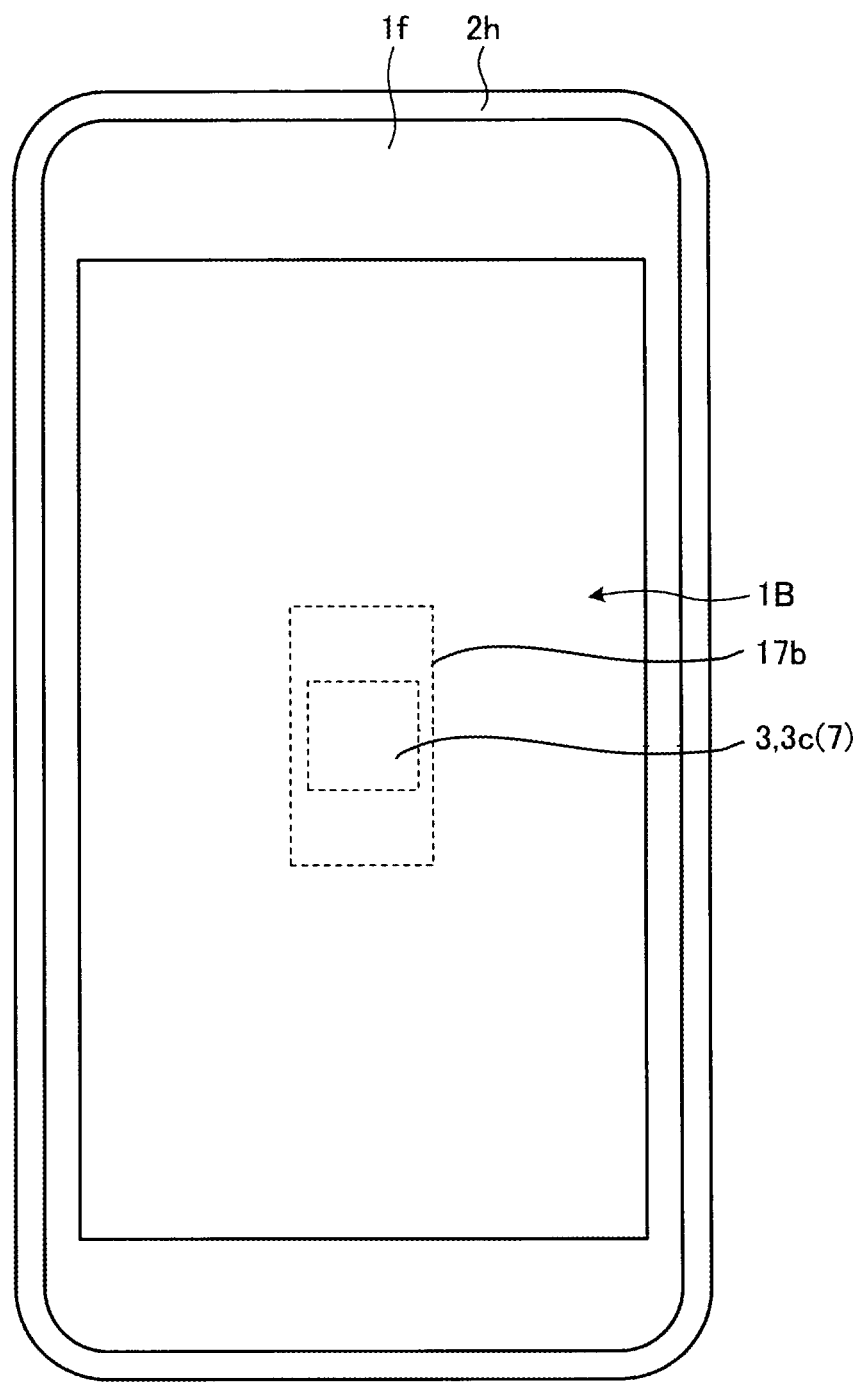
FIG. 36 is a plan view of a smartphone case of a second example of Embodiment 10.
Figure 37:
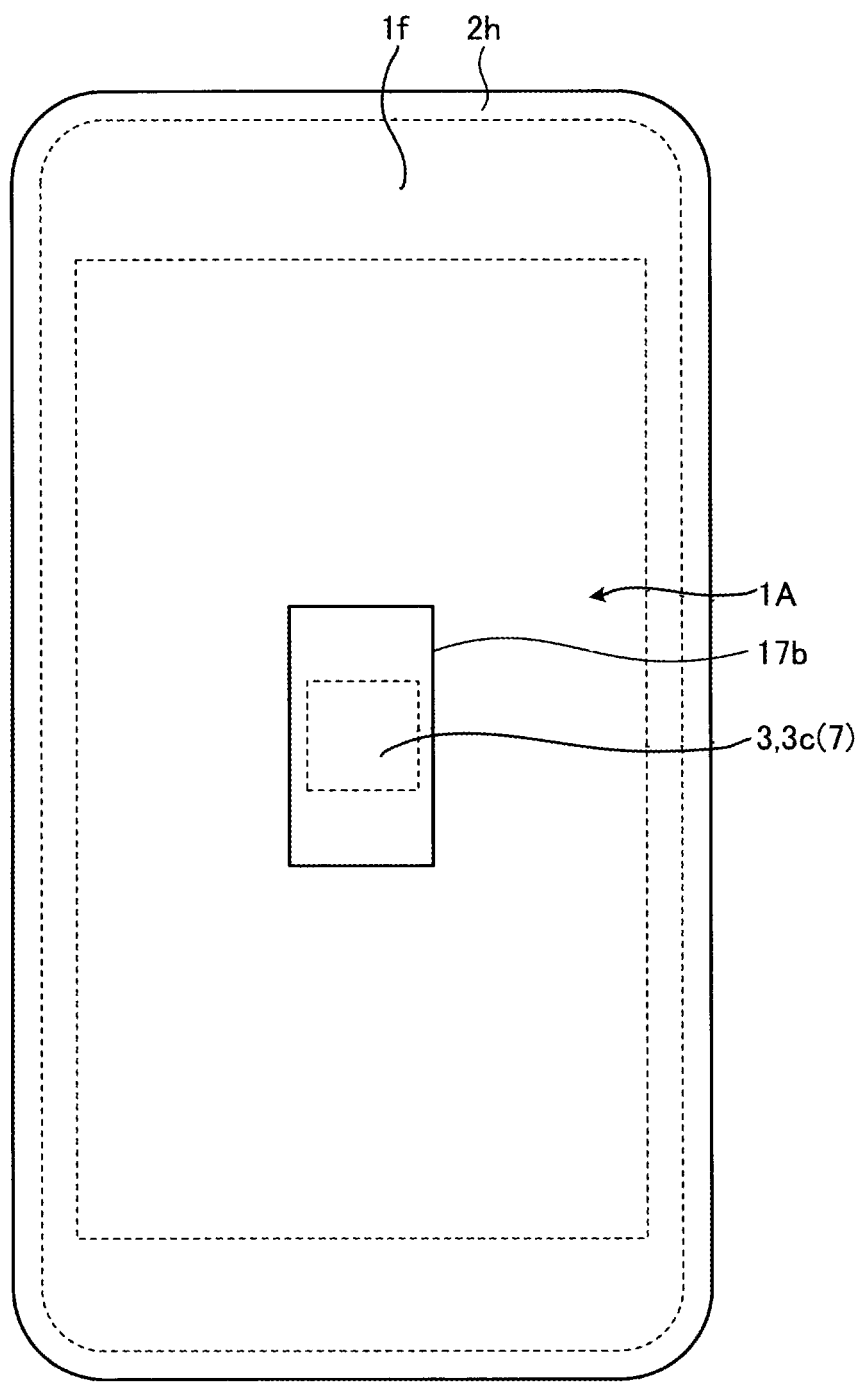
FIG. 37 is a back view of the smartphone case in FIG. 36.
Figure 38:
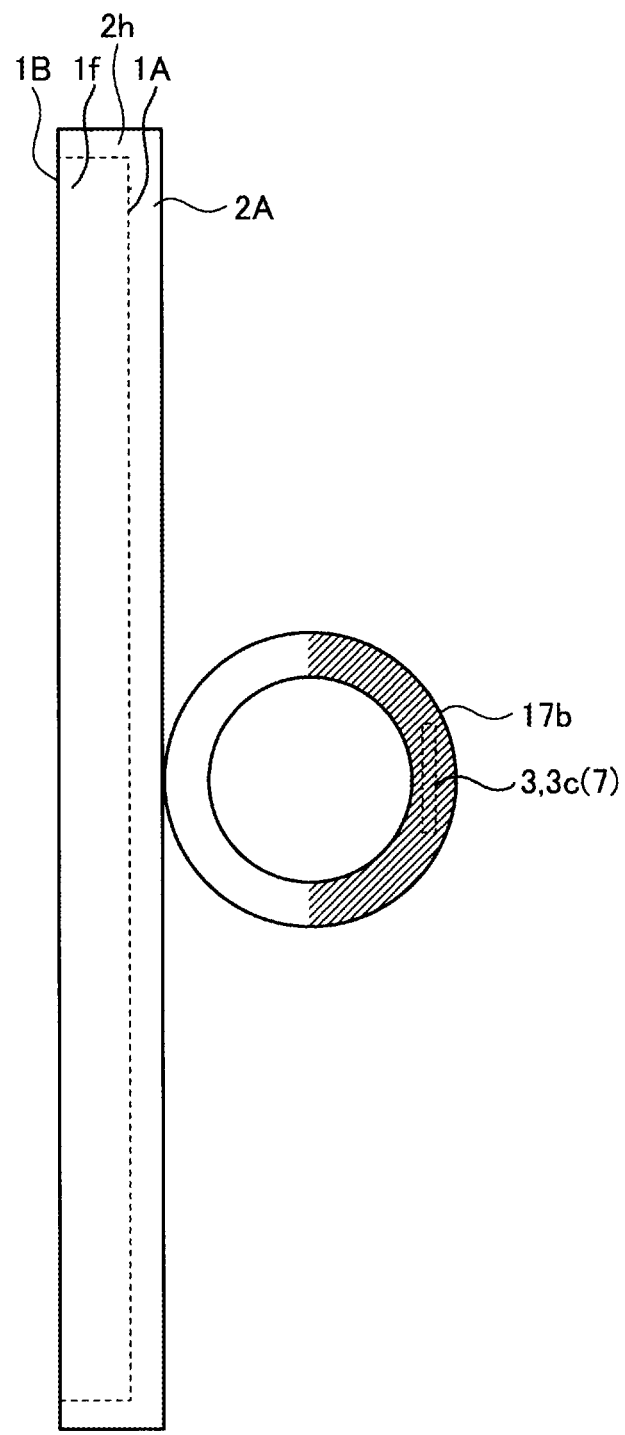
FIG. 38 is a side view of the smartphone case in FIG. 36.

FIG. 36 is a plan view of a smartphone case of a second example of Embodiment 10. FIG. 37 is a back view of the smartphone case in FIG. 36. FIG. 38 is a side view of the smartphone case in FIG. 36.

As illustrated in FIGS. 36 to 38, a smartphone case 2h, which is the second example of Embodiment 10, includes a ring-shaped holding portion 17b on the back surface 1A.

As illustrated in FIGS. 36 to 38, the millimeter-wave band communication antenna 3 or 3c (or the RF module 7) in the second example of Embodiment 10 is embedded in the ring-shaped holding portion 17b.

The smartphone case 2h, which is the second example of Embodiment 10 illustrated in FIGS. 36 to 38, is designed to be held with a finger placed through the ring-shaped holding portion 17b on the back surface 1A of the smartphone case 2h.

Given this, the millimeter-wave band communication antenna 3 or 3c (or the RF module 7) may be fixed in any position within the hatched area of the ring-shaped holding portion 17b illustrated in FIG. 38. This configuration eliminates or reduces the possibility that the user's hand holding the smartphone case 2h will become an obstacle that may deteriorate the communication quality of millimeter-wave band communication. The millimeter-wave band communication antenna 3 or 3c (or the RF module 7) can be fixed to the midsection in the circumferential direction within the hatched area of the ring-shaped holding portion 17b in FIG. 38. Although FIGS. 36 to 38 illustrate an example in which one millimeter-wave band communication antenna 3 or 3c (or one RF module 7) is fixed to the midsection of in the circumferential direction within the hatched area of the ring-shaped holding portion 17b, more than one millimeter-wave band communication antennas 3 or 3c (or more than one RF modules 7) may be arranged in the circumferential direction within the hatched area of the ring-shaped holding portion 17b.

The millimeter-wave band communication antenna 3 or 3c in the holding portion 17a or 17b may be provided, as in Embodiment 1, in the setup where power is fed from the RFIC 4 to the individual patch antennas 3a of the millimeter-wave band communication antenna 3 or 3c through the capacitive coupling C provided between a smartphone 1e and the smartphone case 2g or between a smartphone if and the smartphone case 2h (see FIGS. 2A and 2B). Specifically, with the capacitive coupling C provided, for example, between the back surface 1A of the smartphone 1e and the back surface portion 2A of the smartphone case 2g or between the back surface 1A of the smartphone if and the back surface portion 2A of the smartphone case 2h, wiring may be disposed to feed power to the individual patch antennas 3a of the millimeter-wave band communication antenna 3 or 3c in the holding portion 17a or 17b.

The RF module 7 in the holding portion 17a or 17b may be provided, as in Embodiment 2, in the setup where the smartphone 1e is electrically connected to the smartphone case 2g via the connector 8 or the smartphone if is electrically connected to the smartphone case 2h via the connector 8 (see FIG. 10). Specifically, wiring may be disposed to electrically connect the BBIC 5 in the smartphone 1e or if to the RF module 7 in the holding portion 17a or 17b via the connector 8.

The RF module 7 in the holding portion 17a or 17b may be provided, as in Embodiment 3, in the setup where the smartphone 1e is electrically connected to the smartphone case 2g via the high-speed serial interface 9 or the smartphone if is electrically connected to the smartphone case 2h via the high-speed serial interface 9 (see FIG. 14). Specifically, wiring may be disposed to electrically connect the BBIC 5 in the smartphone case 2g or 2h to the RF module 7 in the holding portion 17a or 17b.

The holding portion in the present embodiment is not limited to the band-shaped holding portion 17a of the first example of Embodiment 10 in FIGS. 33 to 35 and the ring-shaped holding portion 17b of the second example of Embodiment 10 in FIGS. 36 to 38. For example, a knob-like holding portion projecting from the back surface of the smartphone case may be provided.

The embodiments above have been described to facilitate the understanding of the present disclosure and should not be construed as limiting the scope of the present disclosure. The present disclosure may be altered and/or improved without necessarily departing from the spirit of the present disclosure and embraces equivalents thereof. Although the exemplary millimeter-wave band communication antenna in the embodiments above includes an array of patch antennas, the millimeter-wave band communication antenna may be a dipole antenna or a slot antenna or may be a combination of both.

The present disclosure may be implemented as described above or as follows.

(1) A smartphone case according to an aspect of the present disclosure is to be removably attached to a smartphone and includes one or more millimeter-wave band communication antennas associated with a communication circuit for carrying out millimeter-wave band communication.

This configuration offers a high degree of flexibility in the layout of the one or more millimeter-wave band communication antennas. This configuration also offers a high degree of flexibility in the layout of the patch antennas constituting the one or more millimeter-wave band communication antennas and enables precise beamforming accordingly. Thus, the performance of a 5G communication system may be fully exploited.

(2) In the smartphone case described above in (1), power can be fed through capacitive coupling to the one or more millimeter-wave band communication antennas by one or more RFICs that process radio-frequency signals.

Without necessarily electric contacts in the smartphone, this configuration enables millimeter-wave band communication.

(3) The smartphone case described above in (1) can include one or more RFICs combined respectively with the one or more millimeter-wave band communication antennas to process radio-frequency signals. The one or more RFICs and the one or more millimeter-wave band communication antennas can be combined into one or more RF modules.

This configuration provides low-loss connections between the one or more millimeter-wave band communication antenna and the one or more RFICs, and thus a higher antenna gain is achievable.

(4) The smartphone case described above in (3) can include a BBIC connected to the one or more RF modules to process baseband signals. The BBIC and the one or more RF modules can constitute the communication circuit.

This configuration enables the smartphone without necessarily support for 5G to carry out millimeter-wave band communication.

(5) The smartphone case described above in (4) can include a battery that supplies power at least to the communication circuit.

This configuration enables the smartphone to carry out millimeter-wave band communication with slow battery drain.

(6) The smartphone case described above in (4) or (5) can include a memory that performs buffering on input to and output from the BBIC.

This configuration enables stable millimeter-wave band communication.

(7) The smartphone case described above in any one of (1) to (6) can include: a back surface portion to which a back surface of the smartphone is to be attached; and a front surface portion for protecting a display surface of the smartphone.

This configuration offers a high degree of flexibility in the layout of the one or more millimeter-wave band communication antennas and eases constraints on the number of millimeter-wave band communication antennas to be provided. This will be detailed below in (8) and (9). This configuration also offers a high degree of flexibility in the layout of the patch antennas constituting the one or more millimeter-wave band communication antennas and enables precise beamforming accordingly. Thus, the performance of the 5G communication system may be fully exploited.

(8) In the smartphone case described above in (7), at least one of the one or more millimeter-wave band communication antennas can be provided in the back surface portion.

(9) In the smartphone case described above in (7) or (8), at least one of the one or more millimeter-wave band communication antennas can be provided in the front surface portion.

(10) In the smartphone case described above in any one of (7) to (9), at least one of the one or more millimeter-wave band communication antennas can be provided in a corner portion formed by folding an end portion of the back surface portion or by folding an end portion of the front surface portion.

(11) The smartphone case described above in any one of (7) to (10) can include an obstacle detection sensor that detects an obstacle located in a radiation direction of the one or more millimeter-wave band communication antennas, and the communication circuit can stop the millimeter-wave band communication when the obstacle detection sensor detects an obstacle.

This configuration reduces unnecessary power consumption.

(12) In the smartphone case described above in any one of (7) to (11), the communication circuit can stop the millimeter-wave band communication when the smartphone case is folded in such a manner that the front surface portion of the smartphone case faces the display surface of the smartphone.

Owing to configuration, the smartphone may millimeter-wave band communication when the need to do so arises, that is, only while the user keeps the smartphone case unfolded. This leads to a reduction in power consumption.

(13) In the smartphone case described above in any one of (7) to (11), an opening corresponding to the display surface of the smartphone can be provided in the front surface portion of the smartphone case.

Owing to this configuration, millimeter-wave band communication may be carried out when the smartphone case is in the folded state.

(14) In the smartphone case described above in (13), a radiation surface of the at least one of the one or more millimeter-wave band communication antennas that is provided in the back surface portion and a radiation surface of the at least one of the one or more millimeter-wave band communication antennas that is provided in the front surface portion can be oriented in different directions when the smartphone case is folded in such a manner that the front surface portion of the smartphone case faces the display surface of the smartphone.

Owing to this configuration, millimeter-wave band communication may be carried out even when the smartphone case is in the folded state.

(15) The smartphone case described above in any one of (1) to (6) can include a holding portion fixed to a back surface portion to which a back surface of the smartphone is to be attached, and at least one of the one or more millimeter-wave band communication antennas can be provided in the holding portion.

This configuration eliminates or reduces the possibility that the user's hand will become an obstacle that may deteriorate the communication quality of millimeter-wave band communication.

(16) In the smartphone case described above in any one of (7) to (15), the communication circuit can carry out communication under a multiple-input multiple-output (MIMO) scheme through the millimeter-wave band communication antennas.

This configuration enhances the communication speed of the millimeter-wave band communication.

(17) In the smartphone case described above in any one of (7) to (15), the communication circuit can carry out communication under a diversity scheme through the millimeter-wave band communication antennas.

This configuration enhances the communication quality and the reliability of the millimeter-wave band communication.

The present disclosure is conducive to millimeter-wave band communication robust in terms of connection stability.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A smartphone case configured to be removably attached to a smartphone, the smartphone case comprising:
    at least one millimeter-wave band communication antenna configured to carry out millimeter-wave band communication as part of a communication circuit;
    a back surface portion to which a back surface of the smartphone is configured to attach; and
    a front surface portion configured to protect a display surface of the smartphone, wherein:
    a first of the at least one millimeter-wave band communication antenna is at the back surface portion,
    a second of the at least one millimeter-wave band communication antenna is at the front surface portion, and
    a radiation surface of the first millimeter-wave band communication antenna and a radiation surface of the second millimeter-wave band communication antenna are oriented in different directions when the smartphone case is folded, such that the front surface portion of the smartphone case faces the display surface of the smartphone.

2. The smartphone case according to claim 1, wherein the at least one millimeter-wave band communication antenna is powered by capacitive coupling with at least one radio-frequency integrated circuit (RFIC), the at least one RFIC being configured to process radio-frequency signals transmitted in accordance with the millimeter-wave band communication.

3. The smartphone case according to claim 1, further comprising:
at least one radio-frequency integrated circuit (RFIC) configured to process radio-frequency signals received by, and for transmission by, the at least one millimeter-wave band communication antenna,
wherein the at least one RFIC and the at least one millimeter-wave band communication antenna form at least one radio-frequency (RF) module.

4. The smartphone case according to claim 3, further comprising a baseband integrated circuit (BBIC) connected to the at least one RF module and configured to process baseband signals,
wherein the communication circuit comprises the BBIC and the at least one RF module.

5. The smartphone case according to claim 4, further comprising a battery configured to supply power to the communication circuit.

6. The smartphone case according to claim 4, further comprising memory configured to buffer an input to, and an output from, the BBIC.

7. The smartphone case according to claim 1, wherein a third of the at least one millimeter-wave band communication antenna is at a corner portion, the corner portion being at a folding position of an end portion of the back surface portion or a folding position of an end portion of the front surface portion.

8. The smartphone case according to claim 1, further comprising:
an obstacle detection sensor configured to detect an obstacle located in a radiation direction of the at least one millimeter-wave band communication antenna,
wherein the communication circuit is configured to stop the millimeter-wave band communication when the obstacle detection sensor detects the obstacle.

9. The smartphone case according to claim 1, wherein the communication circuit is configured to stop the millimeter-wave band communication when the smartphone case is folded such that the front surface portion of the smartphone case faces the display surface of the smartphone.

10. The smartphone case according to claim 1, wherein the front surface portion of the smartphone case comprises an opening in which the display surface of the smartphone is viewable when the front surface portion of the smartphone case faces the display surface of the smartphone.

11. The smartphone case according to claim 1, further comprising a holding portion fixed to a back surface portion of the smartphone case, the back surface portion being a portion of the smartphone case to which a back surface of the smartphone is configured to attach,
wherein a third of the at least one millimeter-wave band communication antenna is at the holding portion.

12. The smartphone case according to claim 1, wherein the communication circuit is configured to carry out communication under a multiple-input multiple-output (MIMO) scheme through the at least one millimeter-wave band communication antenna.

13. The smartphone case according to claim 1, wherein the communication circuit is configured to carry out communication under a diversity scheme through the at least one millimeter-wave band communication antenna.

* * * * *